US010860826B2

(12) United States Patent
Norieda et al.

(10) Patent No.: US 10,860,826 B2
(45) Date of Patent: Dec. 8, 2020

(54) INFORMATION PROCESSING APPARATUS, CONTROL METHOD, AND PROGRAM

(71) Applicant: NEC Corporation, Tokyo (JP)

(72) Inventors: Shin Norieda, Tokyo (JP); Makoto Yoshimoto, Tokyo (JP); Yoshinori Saida, Tokyo (JP); Hiroki Kosuge, Tokyo (JP); Yoshiaki Aoyagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/085,146

(22) PCT Filed: Jun. 7, 2017

(86) PCT No.: PCT/JP2017/021091
§ 371 (c)(1),
(2) Date: Sep. 14, 2018

(87) PCT Pub. No.: WO2018/037666
PCT Pub. Date: Mar. 1, 2018

(65) Prior Publication Data
US 2019/0347458 A1 Nov. 14, 2019

(30) Foreign Application Priority Data
Aug. 24, 2016 (JP) .................... 2016-163578

(51) Int. Cl.
*G06K 7/14* (2006.01)
*G06F 16/51* (2019.01)

(52) U.S. Cl.
CPC ........... *G06K 7/1413* (2013.01); *G06F 16/51* (2019.01)

(58) Field of Classification Search
USPC ....................................... 235/462.1
See application file for complete search history.

(56) References Cited

U.S. PATENT DOCUMENTS 5,583,975 A * 12/1996 Naka .................. G06T 15/06
345/424
6,271,875 B1 * 8/2001 Shimizu .............. G06F 3/011
348/169

(Continued)

FOREIGN PATENT DOCUMENTS

JP 2002-074287 A 3/2002
JP 2004-295523 A 10/2004

(Continued)

OTHER PUBLICATIONS

International Search Report for PCT Application No. PCT/JP2017/021091, dated Aug. 29, 2017.

(Continued)

*Primary Examiner* — Michael G Lee
*Assistant Examiner* — David Tardif

(57) ABSTRACT

An information processing apparatus (2000) includes a conversion unit (2020) and a computation unit (2040). The conversion unit (2020) detects a plurality of markers from a camera image (10). The conversion unit (2020) converts the detected markers into corresponding sub-identifier information. The computation unit (2040) computes an identifier using a plurality of sub-identifiers converted by the conversion unit (2020).

6 Claims, 27 Drawing Sheets

(56) References Cited

U.S. PATENT DOCUMENTS

| | | | |
|---|---|---|---|
| 7,508,739 B2* | 3/2009 | Paes | A63B 69/0028 |
| | | | 235/377 |
| 2004/0026511 A1* | 2/2004 | Cheung | G06K 7/1443 |
| | | | 235/462.1 |
| 2006/0104529 A1* | 5/2006 | Messina | G06T 11/60 |
| | | | 382/243 |
| 2015/0228122 A1 | 8/2015 | Sadasue | |
| 2020/0051075 A1* | 2/2020 | Yoo | G06Q 20/409 |

FOREIGN PATENT DOCUMENTS

| | | |
|---|---|---|
| JP | 2007-219779 A | 8/2007 |
| JP | 2009-295108 A | 12/2009 |
| JP | 2015-153046 A | 8/2015 |
| JP | 2016-122271 A | 7/2016 |

OTHER PUBLICATIONS

English translation of Written opinion for PCT Application No. PCT/JP2017/021091.

* cited by examiner

FIG. 8
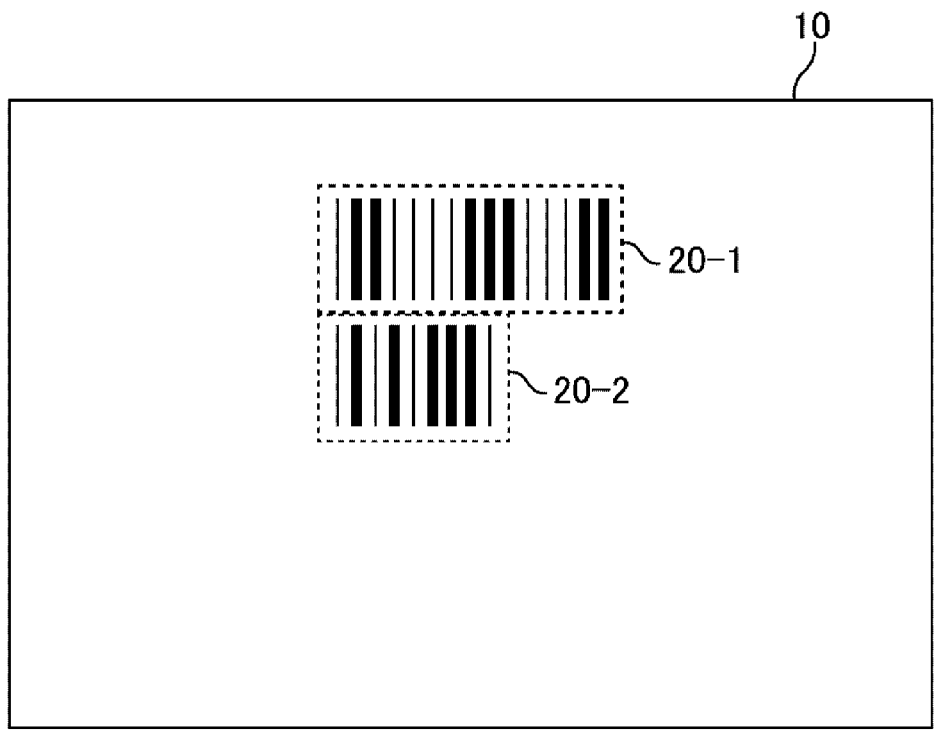
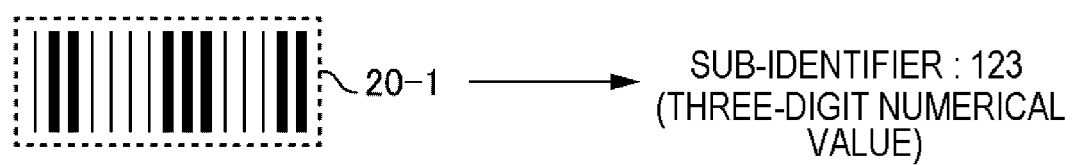
SUB-IDENTIFIER : 123
(THREE-DIGIT NUMERICAL VALUE)
SUB-IDENTIFIER : 25
(TWO-DIGIT NUMERICAL VALUE)

FIG. 11
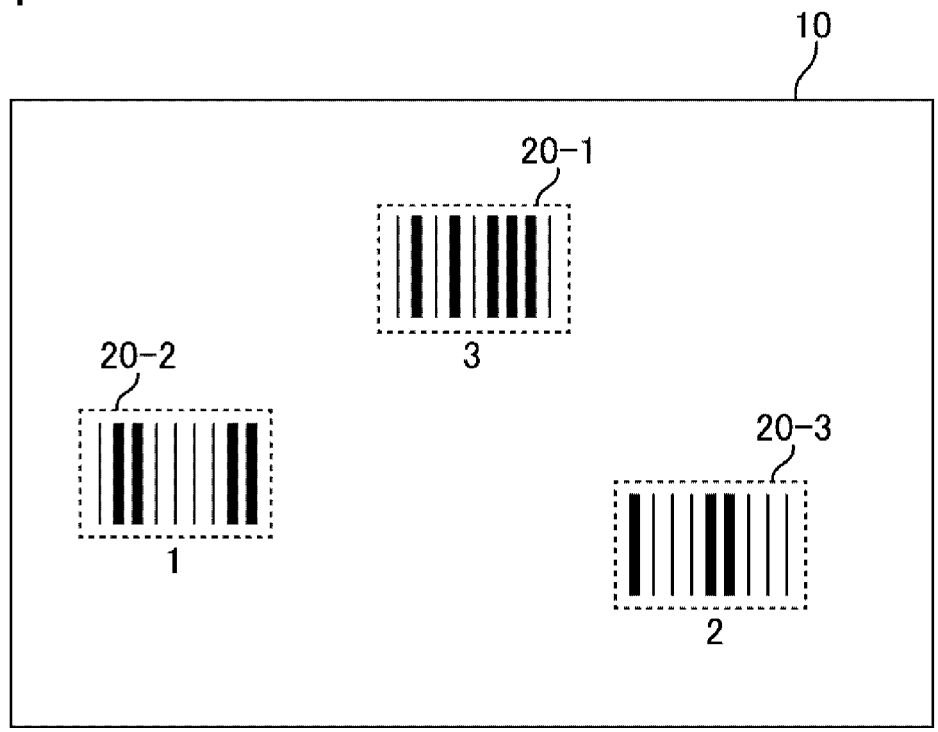
ORDER OF BINDING
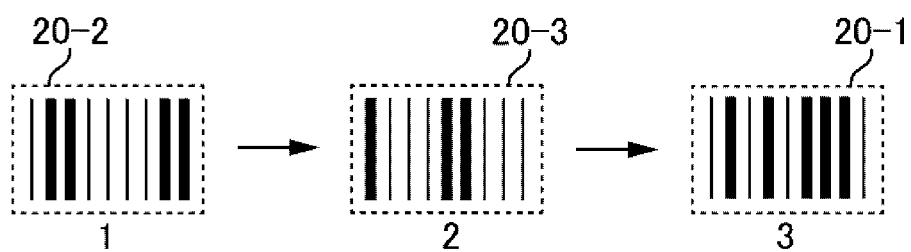

(a)

(b)

(c)

INFORMATION PROCESSING APPARATUS, CONTROL METHOD, AND PROGRAM

This application is a National Stage Entry of PCT/JP2017/021091 filed on Jun. 7, 2017, which claims priority from Japanese Patent Application 2016-163578 filed on Aug. 24, 2016, the contents of all of which are incorporated herein by reference, in their entirety.

TECHNICAL FIELD

The present invention relates to an information processing apparatus, a control method, and a program.

BACKGROUND ART

Techniques for detecting markers from a camera image have been developed. For example, in the field of augmented reality (AR), a process of "detecting an AR marker from a camera image, and superimposes a virtual object corresponding to the AR marker on the camera image to display the superimposed object on a display" is performed.

An object detection process is used in a process of detecting markers from a camera image. In the object detection process, a technique such as, for example, template matching or feature value matching is used. In the template matching, an image region matched with a template image representing a marker is detected from a camera image, and thus the detection of the marker is performed. In addition, in the feature value matching, an image region having a feature value matched with the feature value of a marker is detected from a camera image, and thus the detection of the marker is performed.

A technique for detecting markers from a camera image is disclosed in, for example, Patent Document 1. A display device of Patent Document 1 detects a marker image from a captured image using template matching. Further, the display device overlaps a virtual object associated with the detected marker image on the captured image and displays the overlapped object.

A marker is also used in the identification of an object. For example, Patent Document 2 discloses a technique in which a marker representing an identifier of paper media is attached onto the plane of the paper media, to thereby identify the paper media using the marker.

RELATED DOCUMENTS

Patent Documents

[Patent Document 1] Japanese Patent Application Publication No. 2015-153046
[Patent Document 2] Japanese Patent Application Publication No. 2016-122271

SUMMARY OF THE INVENTION

Technical Problem

In a case where an object is identified using markers, the number of kinds of markers increases in proportion to the number of objects desired to be identified. For example, in a case where 100 products are desired to be identified using markers, 100 kinds of markers different from each other are required. On the other hand, in a case where 1,000 products are desired to be identified using markers, 1,000 kinds of markers different from each other are required.

As the number of kinds of markers increases, the load of a process of detecting markers from a camera image becomes higher. This is because a process of attempting to detect each of a plurality of markers is performed on a camera image. For example, suppose that a process of recognizing markers included in a camera image is executed using template matching in a case where the number of kinds of markers is 1,000. In this case, for each of 1,000 template images, a process of detecting a region matched with the template image from the camera image is executed.

The present invention is contrived in view of the above problem. One of the objects of the present invention is to provide a technique for reducing the load of a process of detecting markers from a camera image.

Solution to Problem

According to the present invention, there is provided an information processing apparatus including: (1) a conversion unit that detects a plurality of markers representing a first identifier from an image, and converts each of the markers into the first identifier; and (2) a computation unit that computes a second identifier from a plurality of the first identifiers.

According to the present invention, there is provided a control method which is executed by a computer. The control method includes: (1) a conversion step of detecting a plurality of markers representing a first identifier from an image, and converting each of the markers into the first identifier; and (2) a computation step of computing a second identifier from a plurality of the first identifiers.

According to the present invention, there is provided a program causing a computer to execute each step of the control method of the present invention.

Advantageous Effects of Invention

According to the present invention, a technique for reducing the load of a process of detecting markers from a camera image is provided.

BRIEF DESCRIPTION OF THE DRAWINGS

The above and other objects, features and advantages will be made clearer from certain preferred example embodiments described below, and the following accompanying drawings.

FIG. 8 is a diagram illustrating a case in which one identifier is represented by two markers having different amounts of information.

FIG. 11 is a diagram illustrating a scene in which numerical values indicating the binding order of sub-identifiers are shown in the vicinities of markers.

DESCRIPTION OF EMBODIMENTS

Figure 1:
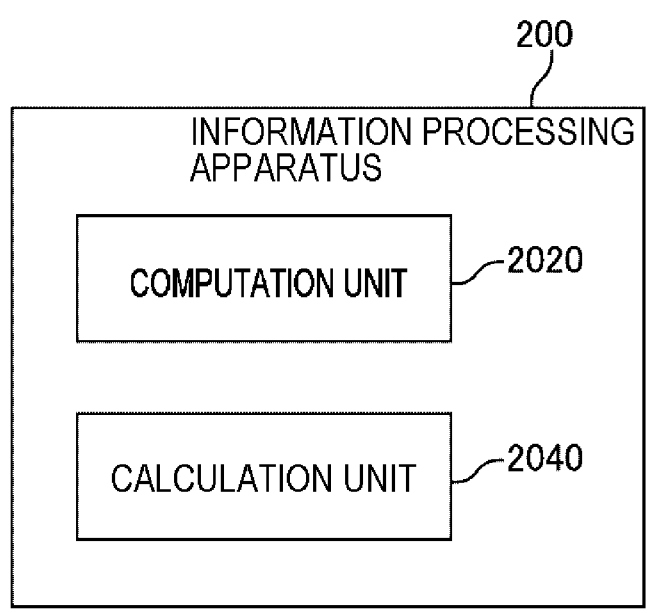
FIG. 1 is a block diagram illustrating an information processing apparatus of Example Embodiment 1.

Hereinafter, example embodiments of the present invention will be described with reference to the accompanying drawings. In all the drawings, like elements are referenced by like reference numerals and the descriptions thereof will not be repeated. In addition, in each block diagram, unless otherwise described, each block represents a function-based block rather than a hardware-based configuration.

Example Embodiment 1

FIG. 1 is a block diagram illustrating an information processing apparatus 2000 of Example Embodiment 1. The information processing apparatus 2000 detects a marker representing a first identifier from a camera image. The camera image is an image including a scene captured by a camera. The marker is any mark capable of being imaged by a camera. The information processing apparatus 2000 computes one second identifier using the first identifier represented by each of the detected markers. Hereinafter, the first identifier is denoted as a sub-identifier. In addition, the second identifier is simply denoted as an identifier.

Figure 2:
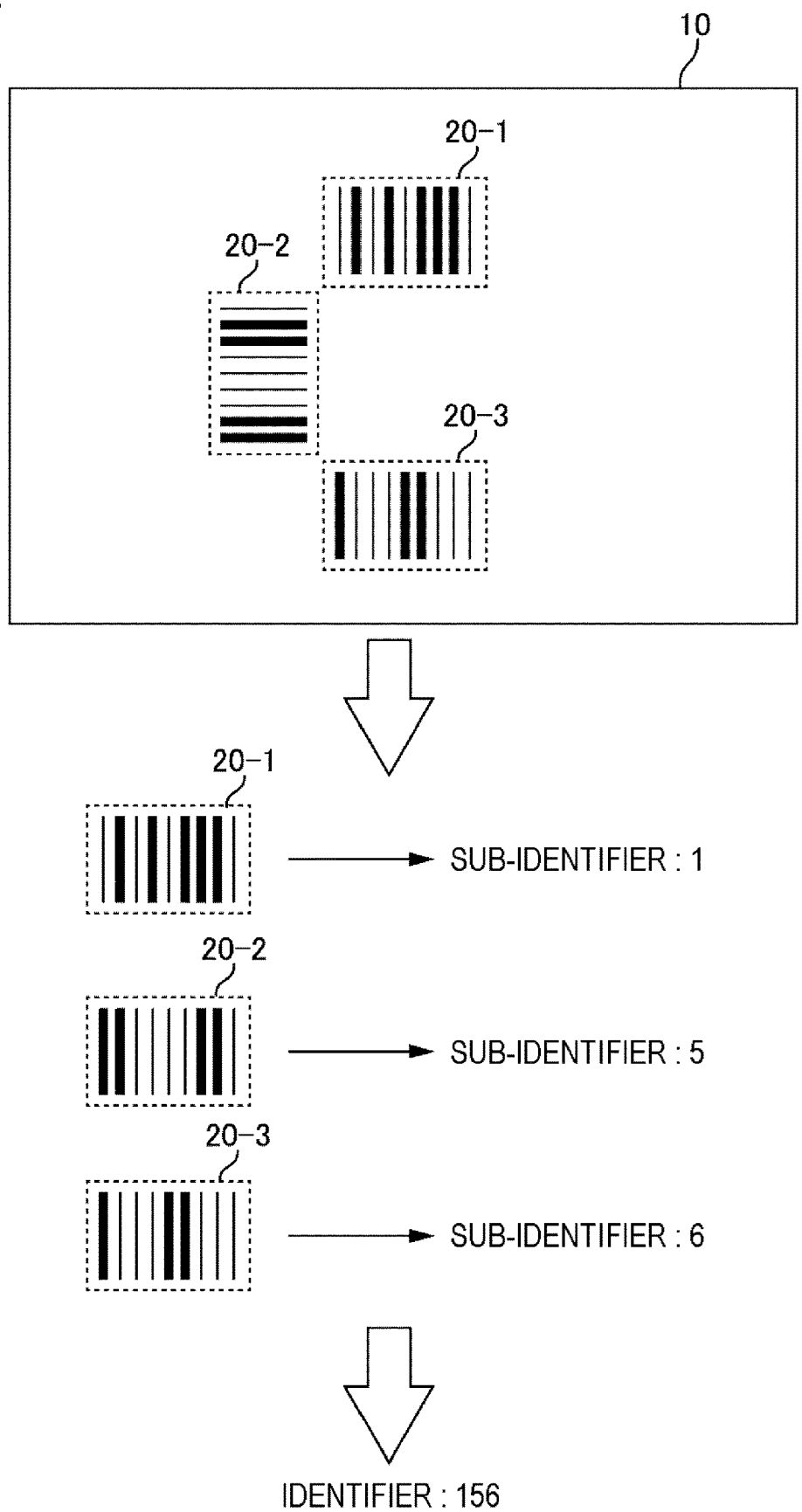
FIG. 2 is a diagram conceptually illustrating a process which is executed by the information processing apparatus.

FIG. 2 is a diagram conceptually illustrating a process which is executed by the information processing apparatus 2000. A camera image 10 is a camera image which is handled by the information processing apparatus 2000. In this example, a marker is a bar code 20. An example of markers other than a bar code will be described later. Three bar codes 20 are included in the camera image 10. Each of the bar codes 20 is assumed to represent a sub-identifier of any of 1 to 9. Note that, in FIG. 2 dotted lines surrounding the bar code 20 are shown for explanation, and is not included in the camera image 10 in reality. Regarding these dotted lines, the same is true of this drawing and the subsequent ones.

The bar codes 20-1 to 20-3 represent one identifier by the combination thereof. In this example, it is assumed that one identifier is computed by binding a sub-identifier corresponding to the bar code 20-1, a sub-identifier corresponding to the bar code 20-2, and a sub-identifier corresponding to the bar code 20-3 in this order.

First, the information processing apparatus 2000 detects the bar code 20-1, the bar code 20-2, and the bar code 20-3 from the camera image 10. Further, the information processing apparatus 2000 computes one identifier using sub-identifiers represented by these markers. Here, it is assumed that a sub-identifier represented by the bar code 20-1 is "1", a sub-identifier represented by the bar code 20-2 is "5", and a sub-identifier represented by the bar code 20-3 is "6". Then, the information processing apparatus 2000 computes an identifier of "156".

Here, the above-described example is an illustration for facilitating understanding relevant to the information processing apparatus 2000, and the operation of the information processing apparatus 2000 is not limited to the above-described example.

The information processing apparatus 2000 includes a conversion unit 2020 and a computation unit 2040. The conversion unit 2020 detects a marker from the camera image 10. The conversion unit 2020 converts the detected marker into a corresponding sub-identifier.

The computation unit 2040 computes an identifier using a plurality of sub-identifiers. The identifier is an identifier capable of being computed on the basis of a plurality of sub-identifiers. For example, the identifier is computed by binding a plurality of sub-identifiers in a predetermined order. In a case of the example of FIG. 2, an identifier of "156" is computed by binding sub-identifiers of "1", "5", and "6" in this order.

Note that, a method of computing an identifier from sub-identifiers is not limited to the above method. The details of a method of computing an identifier will be described later.

<Advantageous Effect>

In this manner, an identifier handled by the information processing apparatus 2000 of the present example embodiment is computed using a combination of sub-identifiers represented by each of a plurality of markers. In other words, a combination of a plurality of markers corresponds to one identifier. In this manner, the load of a process of detecting a marker from the camera image 10 is reduced as compared with a case in which one identifier is represented by one marker.

For example, 1,000 products are desired to be identified using markers. In this case, it is assumed that one marker is associated with an identifier of each product. That is, the identification of a product is performed using 1,000 kinds of markers. In this case, an apparatus that detects a marker from the camera image 10 attempts to detect each of 1,000 kinds of markers. In order to detect a marker from the camera image 10, for example, using template matching, a process of template matching is required for each of 1,000 template images.

On the other hand, it is assumed that an identifier of each of 1,000 products is represented using three markers. For example, a marker representing any of "00" to "09", a marker representing any of "10" to "19", and a marker representing any of "20" to "29" are used. In a case where a combination of these three markers is used, it is possible to represent identifiers of "10 kinds×10 kinds×10 kinds=1,000 kinds". That is, 1,000 products can be identified by 30 kinds of markers.

In this manner, one identifier is represented by a combination of a plurality of markers, and thus it is possible to reduce the total number of markers required for identification. Therefore, the load of a process of detecting a marker is reduced as compared with a case in which one identifier is represented by one marker.

For example, in a case of the above-described example, a process required for detecting a marker from the camera image 10 is template matching for each of 30 template images. Thus, the load of a process of detecting a marker is smaller than in a case where template matching has to be performed on each of 1,000 template images.

In addition, to reduce the total number of markers also makes it possible to reduce time and effort required for the advance registration of markers. For example, in a case where a marker is detected using template matching, a template image of each marker is required to be registered with a database or the like in advance. In a case where the total number of markers is reduced, the total number of markers that have to be registered with a database or the like is also reduced. Thus, time and effort required for the advance registration of markers are reduced.

Hereinafter, the present example embodiment will be described in more detail.

<Example of Hardware for Realizing Information Processing Apparatus 20000>

Each functional configuration unit of the information processing apparatus 2000 may be realized by hardware (such as, for example, a hard-wired electronic circuit) for realizing each functional configuration unit, and may be realized by a combination of hardware and software (such as, for example, a combination of an electronic circuit and a program for controlling the electronic circuit).

Figure 3:
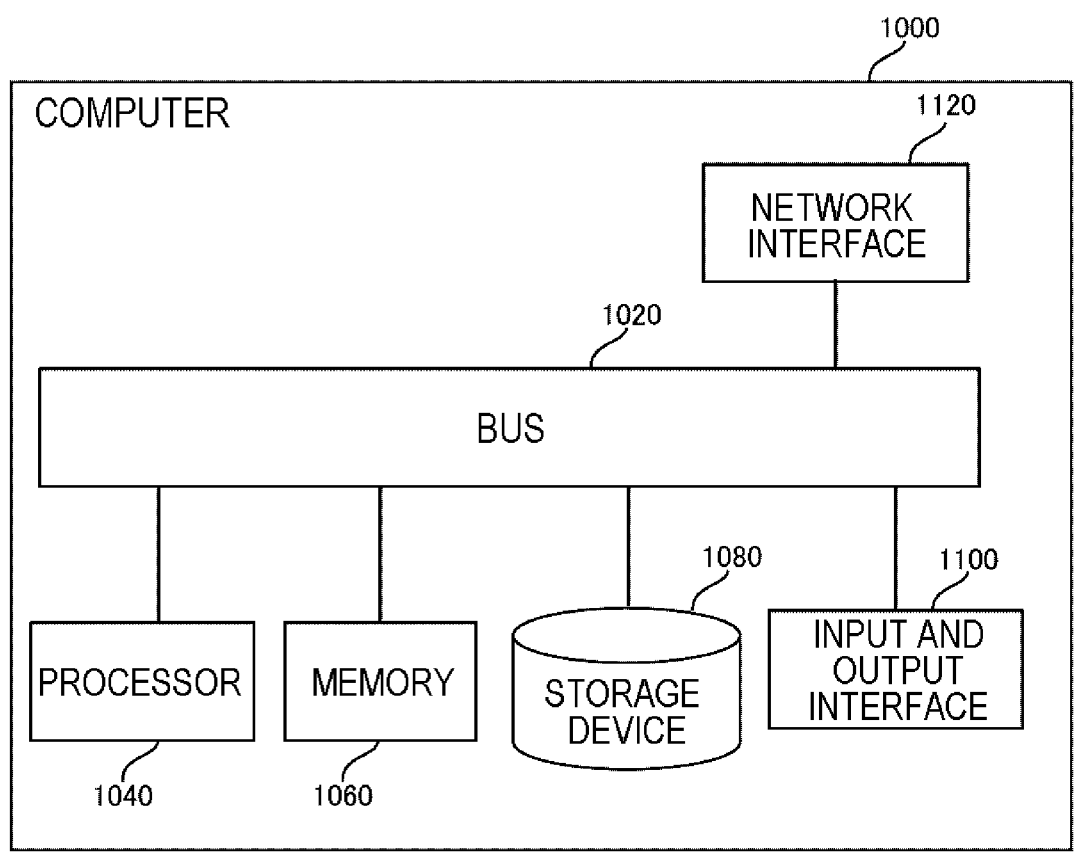
FIG. 3 is a diagram illustrating a computer for realizing the information processing apparatus.

FIG. 3 is a diagram illustrating a computer 1000 for realizing the information processing apparatus 2000. The computer 1000 is any computer. For example, the computer 1000 is a portable terminal (tablet terminal or smartphone), a personal computer (PC), a server machine, or the like. The computer 1000 may be a dedicated computer designed in order to realize the information processing apparatus 2000, and may be a general-purpose computer.

The computer 1000 includes a bus 1020, a processor 1040, a memory 1060, a storage device 1080, an input and output interface 1100, and a network interface 1120. The bus 1020 is a data transmission channel in order for the processor 1040, the memory 1060, the storage device 1080, the input and output interface 1100, and the network interface 1120 to mutually transmit and receive data. However, a method of connecting the processor 1040 and the like to each other is not limited to a bus connection.

The processor 1040 is a processor such as a central processing unit (CPU) or a graphics processing unit (GPU). The memory 1060 is a memory which is realized using a random access memory (RAM) or the like. The storage device 1080 is a storage device which is realized using a hard disk, a solid state drive (SSD), a read only memory (ROM), a flash memory, or the like.

The input and output interface 1100 is an interface for connecting the computer 1000 to a peripheral device. The network interface 1120 is an interface for connecting the computer 1000 to a communication network. A method of the network interface 1120 being connected to a communication network may be a wireless connection, or may be a wired connection.

The storage device 1080 stores a program module for realizing each function of the information processing apparatus 2000. The processor 1040 reads out this program module to the memory 1060 and executes the read-out program module, to thereby realize each function of the information processing apparatus 2000.

<Flow of Processes>

Figure 4:
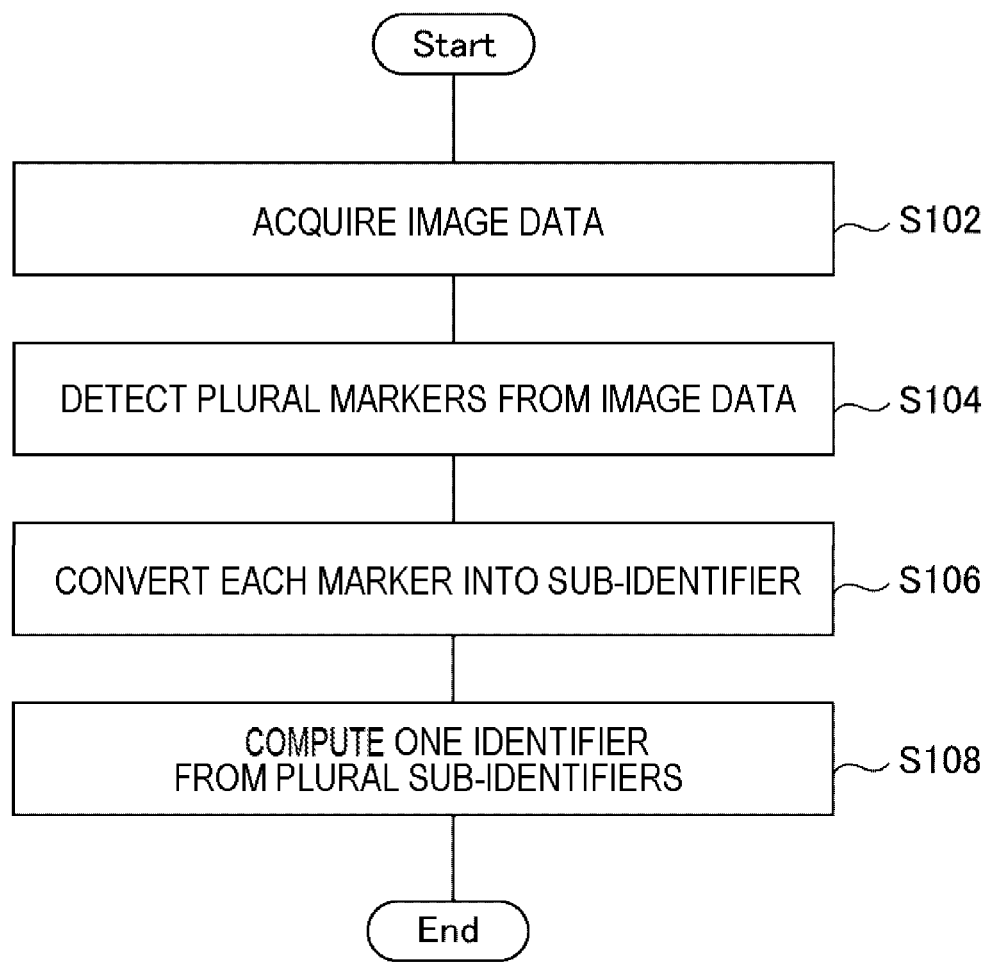
FIG. 4 is a flow diagram illustrating a flow of processes which are executed by the information processing apparatus of Example Embodiment 1.

FIG. 4 is a flow diagram illustrating a flow of processes which are executed by the information processing apparatus 2000 of Example Embodiment 1. The conversion unit 2020 acquires the camera image 10 (S102). The conversion unit 2020 detects a plurality of markers from the camera image 10 (S104). The conversion unit 2020 converts each of the markers into a sub-identifier (S106). The computation unit 2040 computes an identifier from a plurality of sub-identifiers (S108).

<With Respect to Camera Image 10>

The camera image 10 is an image including a scene captured by a camera. The camera image 10 may be an uncompressed camera image generated by a camera, or may be a camera image generated by compressing an uncompressed camera image generated by a camera. The above compression process may be performed by a camera, and may be performed by apparatuses other than a camera.

<Acquisition of Camera Image 10: S102>

The conversion unit 2020 acquires the camera image 10 (S102). A method in which the conversion unit 2020 acquires the camera image 10 is arbitrary. For example, the conversion unit 2020 accesses a storage device in which the camera image 10 is stored, and acquires the camera image 10. The storage device in which the camera image 10 is stored may be provided inside an apparatus (for example, camera) having generated the camera image 10, and may be provided outside thereof. In addition, the conversion unit 2020 may acquire the camera image 10 by receiving the camera image 10 which is transmitted by an apparatus or the like having generated the camera image 10.

<As to Marker>

In the camera image 10, the sub-identifier is represented by a marker. The marker is any mark capable of being imaged by a camera. For example, the marker is a character string (including a numerical value string) representing a sub-identifier. In this case, the marker may be a character string representing a sub-identifier as it is, and may be a character string different from a sub-identifier.

In addition, for example, the marker is a code having a sub-identifier encoded therein. For example, this code is a bar code or a QR code (Registered Trademark). In the example of FIG. 2, the marker is a bar code. In addition, for example, the marker may be any symbol or any pattern. Note that the marker may be an AR marker used in an AR technique, and may be other markers.

Information other than a sub-identifier may also be included in information represented by a marker. For example, a marker may include information or the like relating to the size or price of an object provided with the marker, in addition to a sub-identifier constituting an identifier of the object.

As a location where a marker is provided, any location can be adopted. For example, the marker is provided to various movable properties such as (for example, electric appliances), components of the products, food, clothing ornaments, books, or documents (such as a poster). In addition, the marker may be provided to machines for manufacturing the aforementioned various movable properties or cases (packages or containers) of these movable properties. In addition, for example, the marker may be drawn on a human body. In addition, for example, the marker may be provided to immovable properties such as a wall, a floor, or a column.

Figure 5:
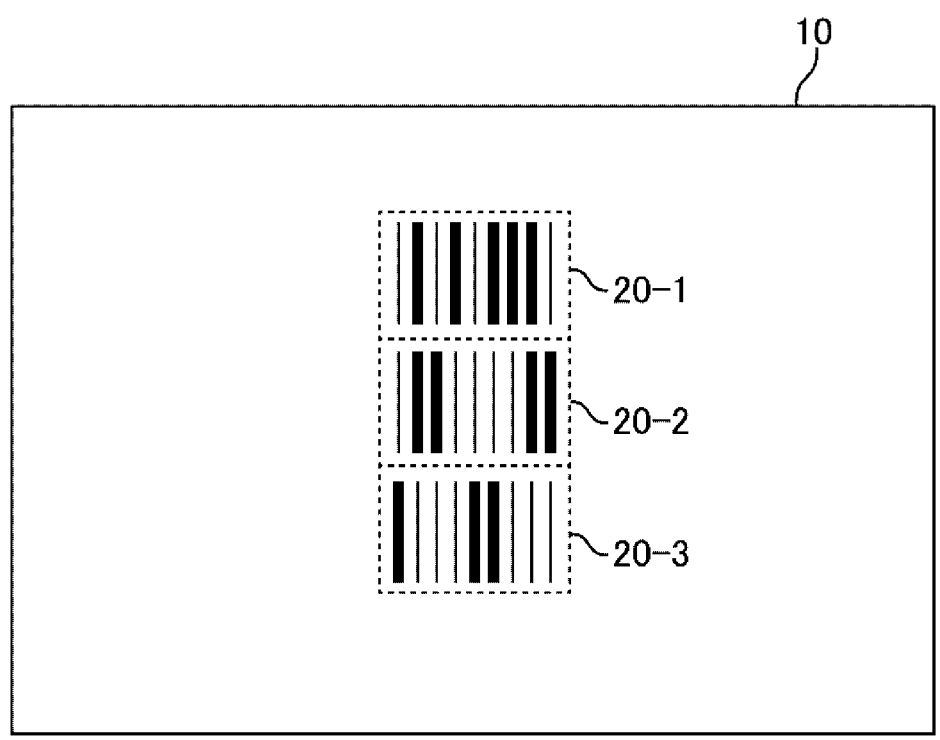
FIG. 5 is a diagram illustrating an example in which a space between markers is smaller than in a case of FIG. 2.

A plurality of markers provided in order to represent one identifier may be disposed with a space to some extent so that these markers can be distinguished from each other, and the size of the space is arbitrary. FIG. 5 is a diagram illustrating an example of a space between markers is smaller than in a case of FIG. 2. In FIG. 5, one identifier is represented by the bar codes 20-1 to 20-3.

In a case where a space between markers is made smaller as in the example of FIG. 5, each marker can be made larger in a limited space. In a case where a marker is large, image capture can be performed at a position relatively away from the marker when an image of the marker is captured using a camera. In addition, since resolution required for a camera which is used to capture an image of a marker becomes lower, it is possible to make a camera necessary to capture an image of a marker inexpensive.

On the other hand, in a case where a space between markers is made larger, the space between markers can be effectively utilized. FIG. 6 are diagrams illustrating an example in which a space between markers is effectively utilized. In FIG. 6A, three markers representing one identifier are provided at the corners of paper. In this manner, a document or the like can be printed on this paper.

Figure 6B:
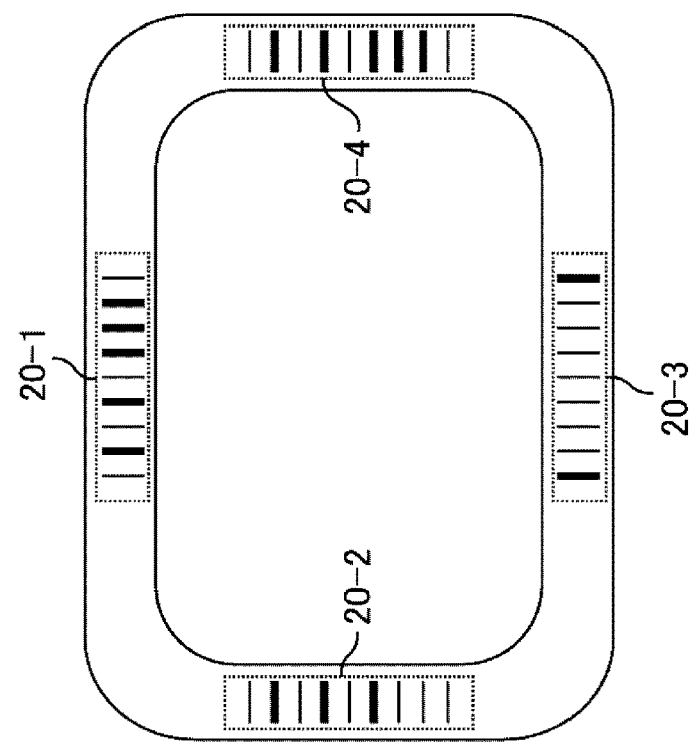
FIG. 6 are diagrams illustrating an example in which a space between markers is effectively utilized.
Figure 6A:
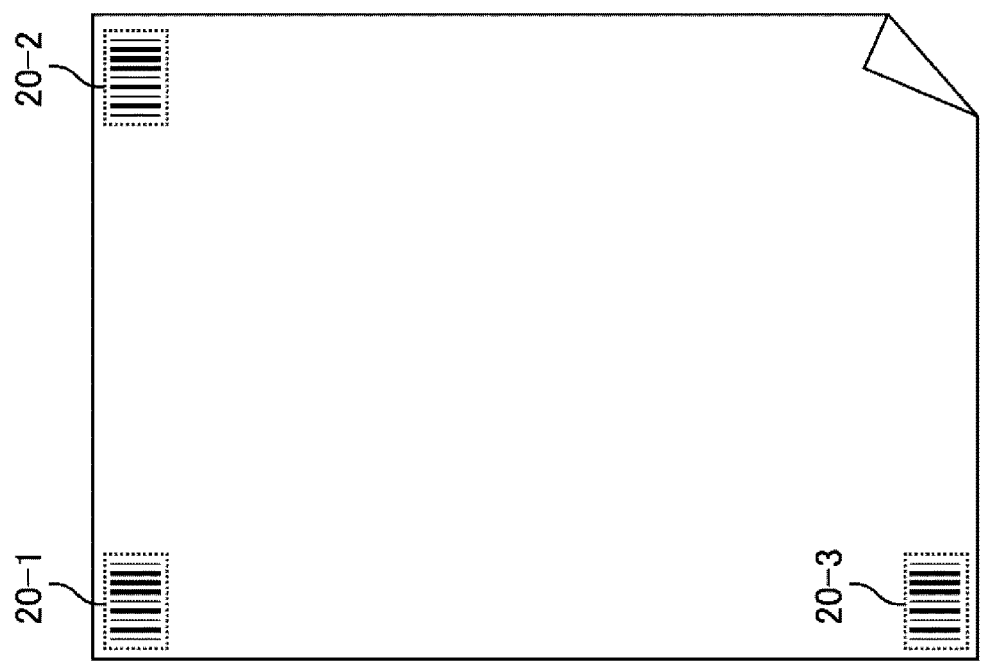

In FIG. 6B, markers representing one identifier are provided the edge of a tray. Therefore, even in a state where an object is placed on this tray, it is possible to capture images of the markers.

As an example of a case in which the tray of FIG. 6B is used, a case will be described in which a tray including components therein is conveyed through a belt conveyor in the line of a factory. In order to manage components in units of trays, an identifier is given to each of the trays. In this case, the identifier of each tray is represented by a plurality of markers printed on the edge of the tray. This makes it possible to capture the tray to generate the camera image 10 even when components are packed in the tray (for example, when the tray having components packed therein is transported using a belt conveyor).

Figure 7:
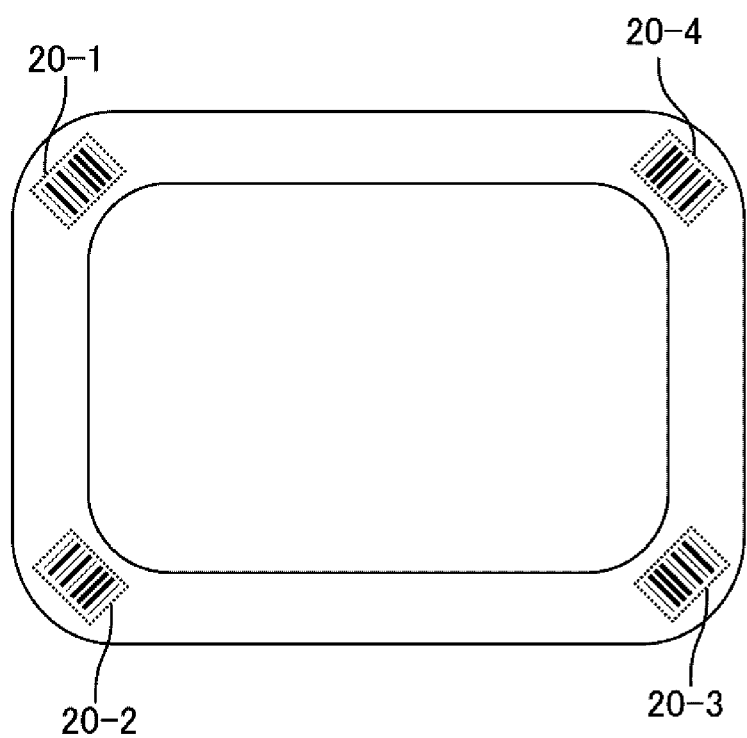
FIG. 7 is a diagram illustrating a case in which markers are disposed at four corners of a tray.

Note that, as another example of a method of disposing markers on the edge of a tray, for example, arrangement or the like shown in FIG. 7 can also be adopted. FIG. 7 is a diagram illustrating a case in which markers are disposed at four corners of a tray. In this manner, markers are disposed on the corners of the tray, and thus the markers are not likely to be more conspicuous than in a case of FIG. 6B.

On the other hand, in the case of FIG. 6B, the markers are disposed on the side portions of the tray, and thus the marker becomes larger than in a case of FIG. 7. In this manner, since the markers are captured to be large on the camera image 10, the accuracy of detection of the markers becomes higher.

The number of markers (the number of sub-identifiers) used in order to represent one identifier is arbitrary. For example, in FIG. 6A, three markers are used in order to represent one identifier. On the other hand, in the example of FIG. 6B, four markers are used in order to represent one identifier.

The amounts of information of a plurality of markers used in order to represent one identifier may be the same as each other, or may be different from each other. The term "amount of information of a marker" as used herein means the number of objects capable of being identified using a sub-identifier represented by the marker. The amount of information of a marker can also be represented by the amount of information of a sub-identifier.

For example, the sub-identifier is assumed to be a one-digit numerical value (0 to 9). In this case, the number of objects capable of being identified by the sub-identifier is ten. On the other hand, the sub-identifier is assumed to be a two-digit numerical value (00 to 99). In this case, the number of objects capable of being identified by the sub-identifier is one hundred. Thus, the latter sub-identifier is larger in the amount of information than the former sub-identifier.

It is preferable that the size of a marker is made larger as the amount of information of marker increases. FIG. 8 is a diagram illustrating a case in which one identifier is represented by two markers having different amounts of information. Here, a sub-identifier represented by a bar code 20-1 is a three-digit numerical value of 123. On the other hand, a sub-identifier represented by a bar code 20-2 is a two-digit numerical value of 25. Thus, the amount of information of the bar code 20-1 is larger than the amount of information of the bar code 20-2. Consequently, in FIG. 8, the size of the bar code 20-1 is made larger than the size of the bar code 20-2.

However, a relationship between the size of the marker and the amount of information of the marker is not limited to the aforementioned relationship. For example, as the amount of information of the marker increases, the size of the marker may be made smaller. In addition, the sizes of the markers may be set to be the same as each other regardless of the amount of information.

<Detection of Marker and Conversion into Sub-Identifier: S104, S106>

The conversion unit 2020 detects a marker from the camera image 10 (S104). The conversion unit 2020 then converts the detected marker into a sub-identifier (S106).

For example, the conversion unit 2020 performs the detection of a marker and conversion into a sub-identifier, using sub-identifier information. The sub-identifier information is information in which a marker and a sub-identifier are associated with each other. The details of the sub-identifier information will be described later.

Template matching or feature value matching, for example, is used in the detection of a marker. Hereinafter, template matching and feature value matching will be described in detail.

<<With Respect to Template Matching>>

Figure 9:
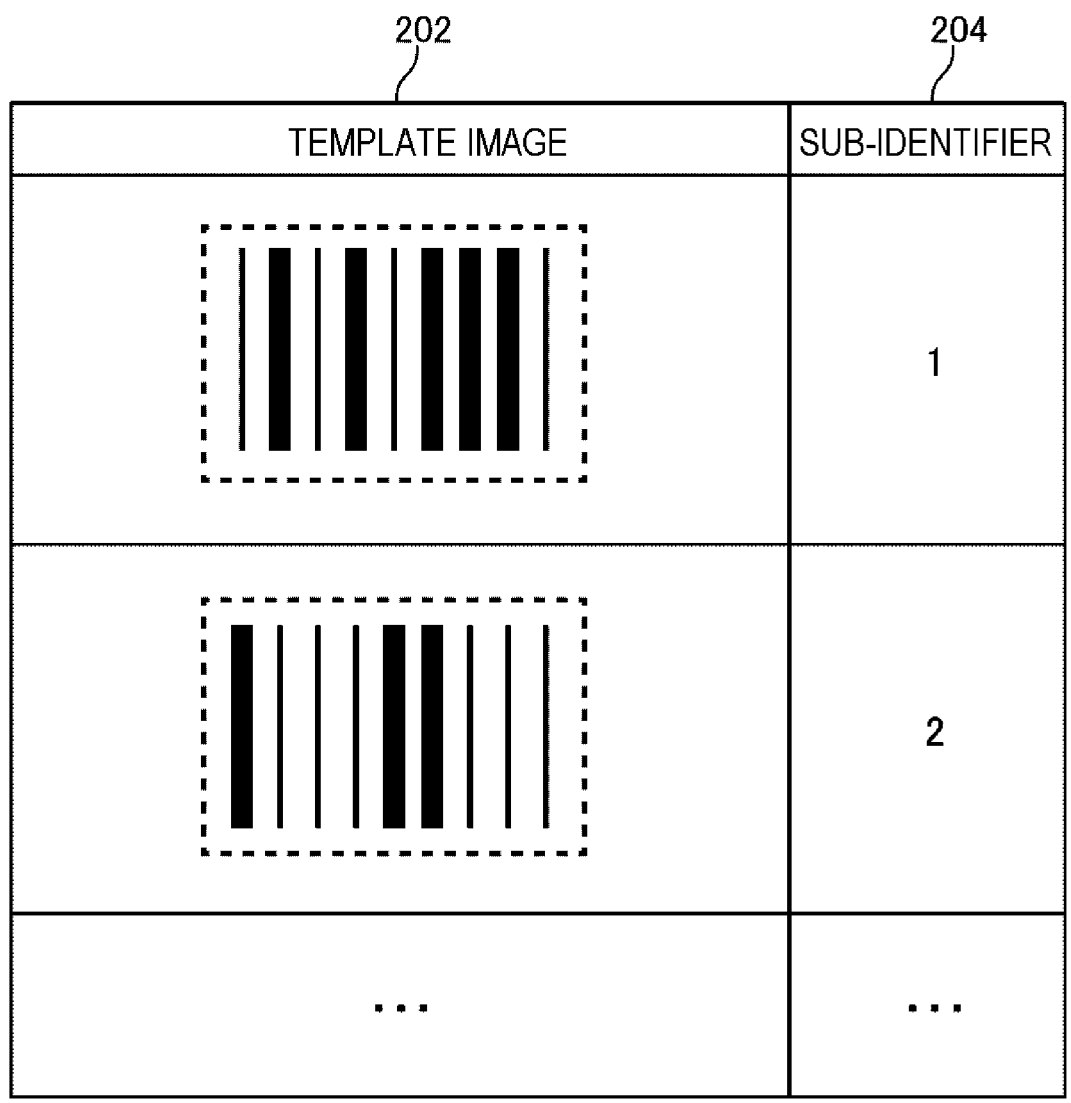
FIG. 9 is a diagram illustrating sub-identifier information used in template matching in a table form.

The conversion unit 2020 that performs template matching uses sub-identifier information in which a template image and a sub-identifier are associated with each other. FIG. 9 is a diagram illustrating sub-identifier information used in template matching in a table form. The table of FIG. 9 is called a table 200. The table 200 includes two columns of a template image 202 and a sub-identifier 204.

The conversion unit 2020 performs matching between an image region included in the camera image 10 and a template image shown in the template image 202, to thereby detect a marker matching with the template image. The conversion unit 2020 then converts the detected marker into a corresponding sub-identifier. The sub-identifier corresponding to the marker is the sub-identifier 204 which is associated with the template image 202 matching with the detected marker.

For example, in the record of a first row of the table 200 of FIG. 9, a sub-identifier of "1" is associated with the template image representing the bar code 20-1 of FIG. 2. Therefore, in a case where the detection of a marker is performed using the table 200 of FIG. 9 with respect to the camera image 10 of FIG. 2, the bar code 20-1 is detected. Consequently, the conversion unit 2020 converts the detected bar code 20-1 into a sub-identifier of "1".

<<With Respect to Feature Value Matching>>

Figure 10:
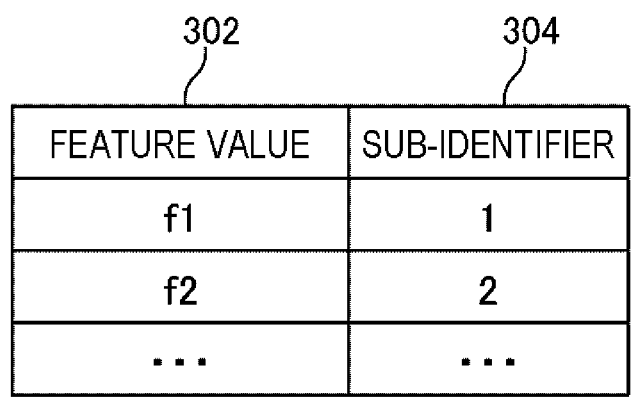
FIG. 10 is a diagram illustrating sub-identifier information used in feature value matching in a table form.

The conversion unit 2020 that performs the feature value matching uses sub-identifier information in which the feature value of a marker and a sub-identifier are associated with each other. The feature value of a marker is represented by one or more scalar values, vector values or the like representing the feature of appearance of the marker. FIG. 10 is a diagram illustrating sub-identifier information used in the feature value matching in a table form. The table of FIG. 10 is called a table 300. The table 300 includes two columns of a feature value 302 and a sub-identifier 304.

The conversion unit 2020 performs matching between an image region included in the camera image 10 and a feature value shown in the feature value 302, to thereby perform the detection of a marker. The conversion unit 2020 then converts the detected marker into a corresponding sub-identifier. The sub-identifier corresponding to the marker is the sub-identifier 304 which is associated with the feature value 302 representing the detected marker.

The sub-identifier information is stored in a storage device provided inside or outside of the information processing apparatus 2000. The conversion unit 2020 acquires and uses the sub-identifier information stored in this storage device.

<Computation of Identifier: S108>

The computation unit 2040 computes one identifier using a plurality of sub-identifiers (S108). Various methods can be adopted in a method of computing an identifier from sub-identifiers. For example, the computation unit 2040 handles a combination of sub-identifiers as an identifier. In addition, for example, the computation unit 2040 computes an identifier by binding sub-identifiers in a predetermined order. In addition, for example, the computation unit 2040 computes an identifier by inputting each sub-identifier to a predetermined equation for computing an identifier from sub-identifiers. Hereinafter, each method will be described in detail.

<<Method 1: Combination of Sub-Identifiers>>

The computation unit 2040 handles a combination of sub-identifiers as an identifier as it is. For example, it is assumed that sub-identifiers of 01, 25, and 32 are respectively computed from three markers. In this case, the computation unit 2040 handles sets "01, 25, 32" of sub-identifiers as an identifier.

<<Method 2: Binding of Sub-Identifiers>>

The computation unit 2040 computes an identifier by binding sub-identifiers in a predetermined order. For example, in the example of FIG. 2, an identifier of "156" is computed by binding sub-identifiers of "1", "5", and "6" in this order.

Here, there are various methods of determining a predetermined order in which sub-identifiers are bound. For example, a predetermined order is determined by a positional relationship between respective markers in the camera image 10. For example, in the example of FIG. 2, a predetermined order of "counterclockwise with a blank region in which a marker is not present set to a starting point" is determined. In this case, the binding order of sub-identifiers becomes an order of "a sub-identifier corresponding to the bar code 20-1, a sub-identifier corresponding to the bar code 20-2, and a sub-identifier corresponding to the bar code 20-3".

In addition, for example, information for determining a predetermined order may be shown in the vicinity of a marker. FIG. 11 is a diagram illustrating a scene in which numerical values indicating the binding order of sub-identifiers are shown in the vicinities of markers. In FIG. 11, numerical values of "3", "1", and "2" are shown in the vicinities of the bar code 20-1, the bar code 20-2, and the bar code 20-3, respectively. In this case, the binding order of sub-identifiers are set to "a sub-identifier corresponding to the bar code 20-2, a sub-identifier corresponding to the bar code 20-3, and a sub-identifier corresponding to the bar code 20-1".

In a case where information for determining a binding order in the vicinity of a marker is shown in this manner, the computation unit 2040 extracts information for determining a binding order from an image region located in the periphery of an image region in which a marker is detected. This peripheral region is, for example, an image region including a position separated by a predetermined distance from the image region in which a marker is detected.

In addition, sub-identifiers may be determined so as to be able to know the binding order of sub-identifiers on the basis of the values of the sub-identifiers. This method can be realized by making the values of respective sub-identifiers constituting one identifier not overlap each other. For example, it is assumed that one identifier is formed by binding (1) a sub-identifier taking a value of any of 00 to 09, (2) a sub-identifier taking a value of any of 10 to 19, and (3) a sub-identifier taking a value of any of 20 to 29 in this order. In this case, each of three markers which are detected from the camera image 10 is converted into any of (1) to (3). The computation unit 2040 then computes an identifier by binding a sub-identifier corresponding to (1), a sub-identifier corresponding to (2), and a sub-identifier corresponding to (3) in this order.

<<Method 3: Computation Using Equation>>

The computation unit 2040 computes an identifier by inputting sub-identifiers to a predetermined equation. Equation (1) is an example of an equation for computing an identifier from sub-identifiers. I represents an identifier, and $sub_k$ represents a k-th sub-identifier. Note that, in Equation (1), both the sub-identifier and the identifier are numerical values.

$$I = \sum_k sub_k \quad (1)$$

For example, it is assumed that one identifier is represented by three sub-identifiers. In addition, it is assumed that the three sub-identifiers are a three-digit numerical value (000, 100, 200, . . . , or 900) the tens place and the ones place of which are 0, a two-digit numerical value (00, 10, 20, . . . , or 90) the ones place of which is 0, and a one-digit numerical value (0, 1, 2, . . . , 9), respectively. In this case, the conversion unit 2020 inputs three sub-identifiers to Equation (1), to thereby compute the sum of these sub-identifiers. In this manner, an identifier represented by a three-digit numerical value is computed. According to this method, an identifier can be represented by any three-digit numerical value.

Example Embodiment 2

Figure 12:
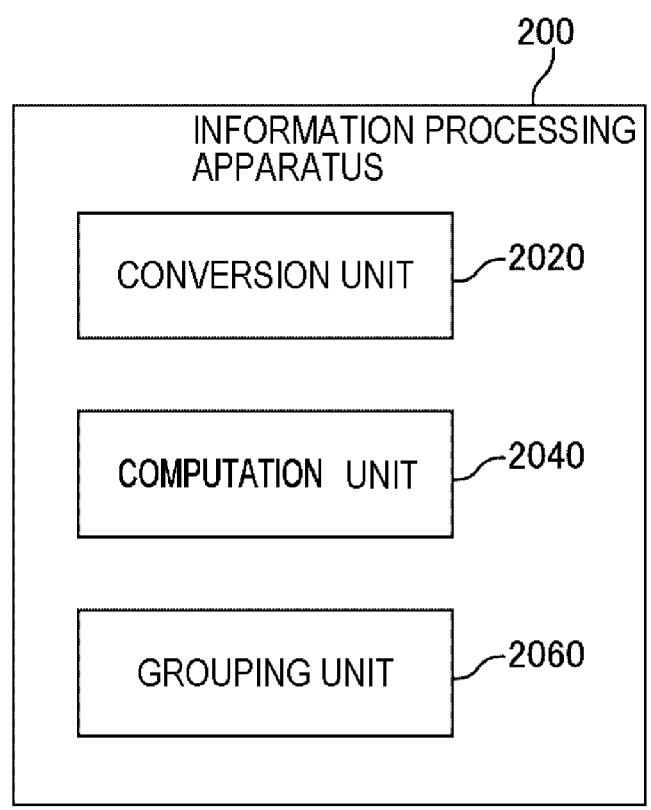
FIG. 12 is a block diagram illustrating an information processing apparatus of Example Embodiment 2.

FIG. 12 is a block diagram illustrating an information processing apparatus 2000 of Example Embodiment 2. Except for matters described below, the information processing apparatus 2000 of Example Embodiment 2 has the same function as that of the information processing apparatus 2000 of Example Embodiment 1.

In the present example embodiment, a plurality of identifier are computed using the camera image 10. In other words, in the camera image 10, a marker used in the computation of a certain identifier and a marker used in the computation of another identifier are mixed.

Consequently, the information processing apparatus 2000 of Example Embodiment 2 includes a grouping unit 2060. The grouping unit 2060 divides a plurality of markers into groups. The computation unit 2040 computes one identifier, for each group, using a sub-identifier represented by each marker included in the group.

Figure 13:
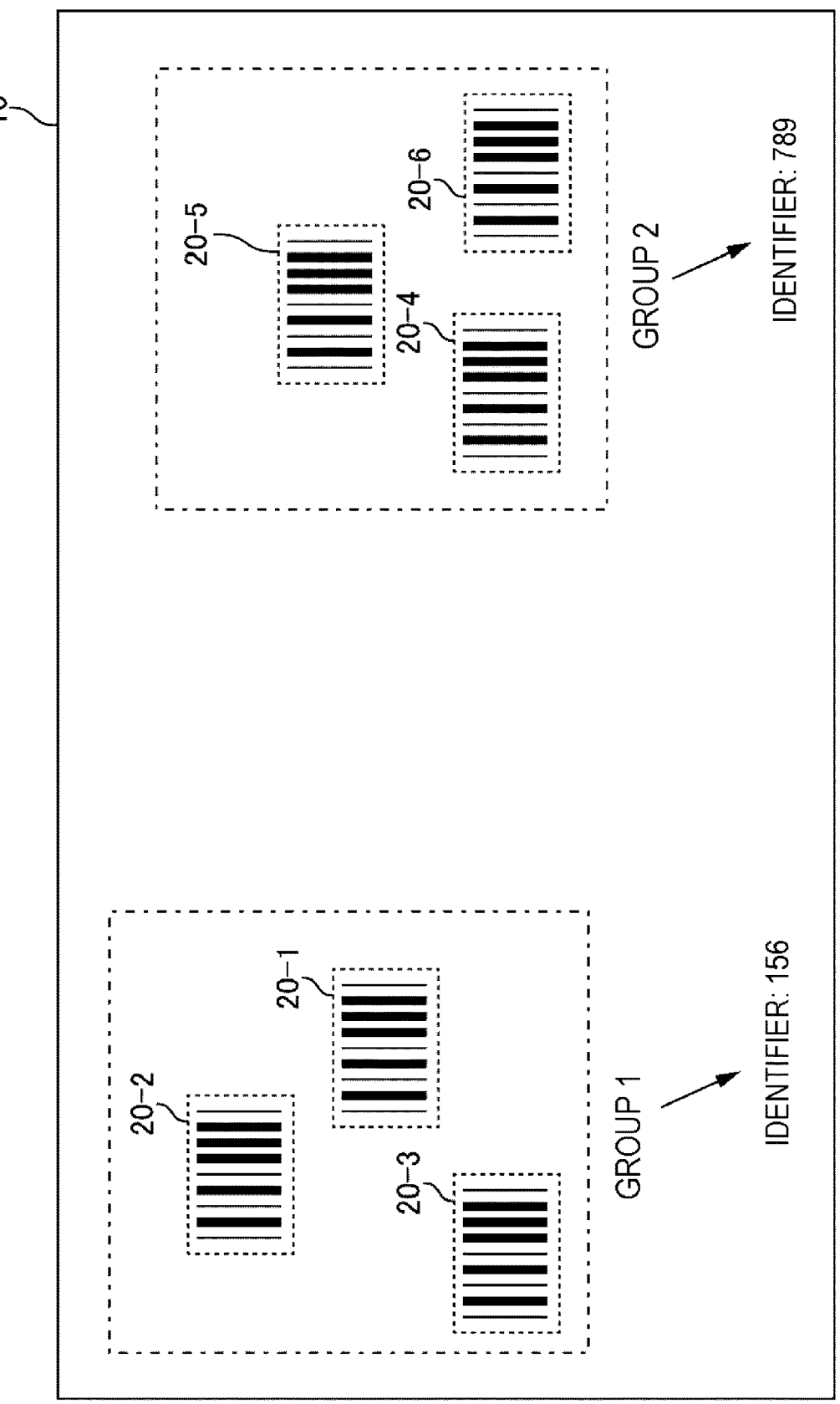
FIG. 13 is a diagram illustrating a camera image which is handled by the information processing apparatus of Example Embodiment 2.

FIG. 13 is a diagram illustrating a camera image 10 which is handled by the information processing apparatus 2000 of Example Embodiment 2. The camera image 10 of FIG. 13 includes bar codes 20-4 to 20-6 in addition to the bar codes 20-1 to 20-3 included in the camera image 10 of FIG. 2.

In the example of FIG. 13, the grouping unit 2060 assigns three bar codes 20-1 to 20-3 to a group 1. In addition, the grouping unit 2060 assigns three bar codes 20-4 to 20-6 to a group 2. Note that a specific method of dividing markers into groups will be described later.

The computation unit 2040 computes an identifier from each of the group 1 and the group 2. Here, it is assumed that sub-identifiers represented by the bar codes 20-1 to 20-6 are "1", "5", "6", "7", "8", and "9", respectively.

First, the computation unit 2040 computes an identifier of "156" by binding sub-identifiers represented by the bar codes 20-1 to 20-3 with respect to the group 1. Further, the computation unit 2040 computes an identifier of "789" by binding sub-identifiers represented by the bar codes 20-4 to 20-6 with respect to the group 2. In this manner, two identifiers are computed from a plurality of bar codes 20 included in the camera image 10.

There are various methods in which the grouping unit 2060 divides markers into groups. For example, there are (1) a method of performing grouping on the basis of a relative position of each marker in the camera image 10, (2) a method of performing grouping on the basis of information representing grouping of markers, and the like. Hereinafter, each method will be described in detail.

<Grouping Based on Relative Position of Marker>

There are various methods in the method of dividing markers into groups on the basis of a relative position. For example, there are (1) a method based on a distance between markers, (2) a method based on a distance between markers and the direction of a marker, (3) a method based on a shape formed by a marker, and the like. Hereinafter, these methods are illustrated.

<<Grouping Based on Distance Between Markers>>

The grouping unit 2060 divides markers into groups on the basis of a distance between the markers. More specifically, the grouping unit 2060 includes a predetermined number of markers located close to each other in the same group.

Figure 14:
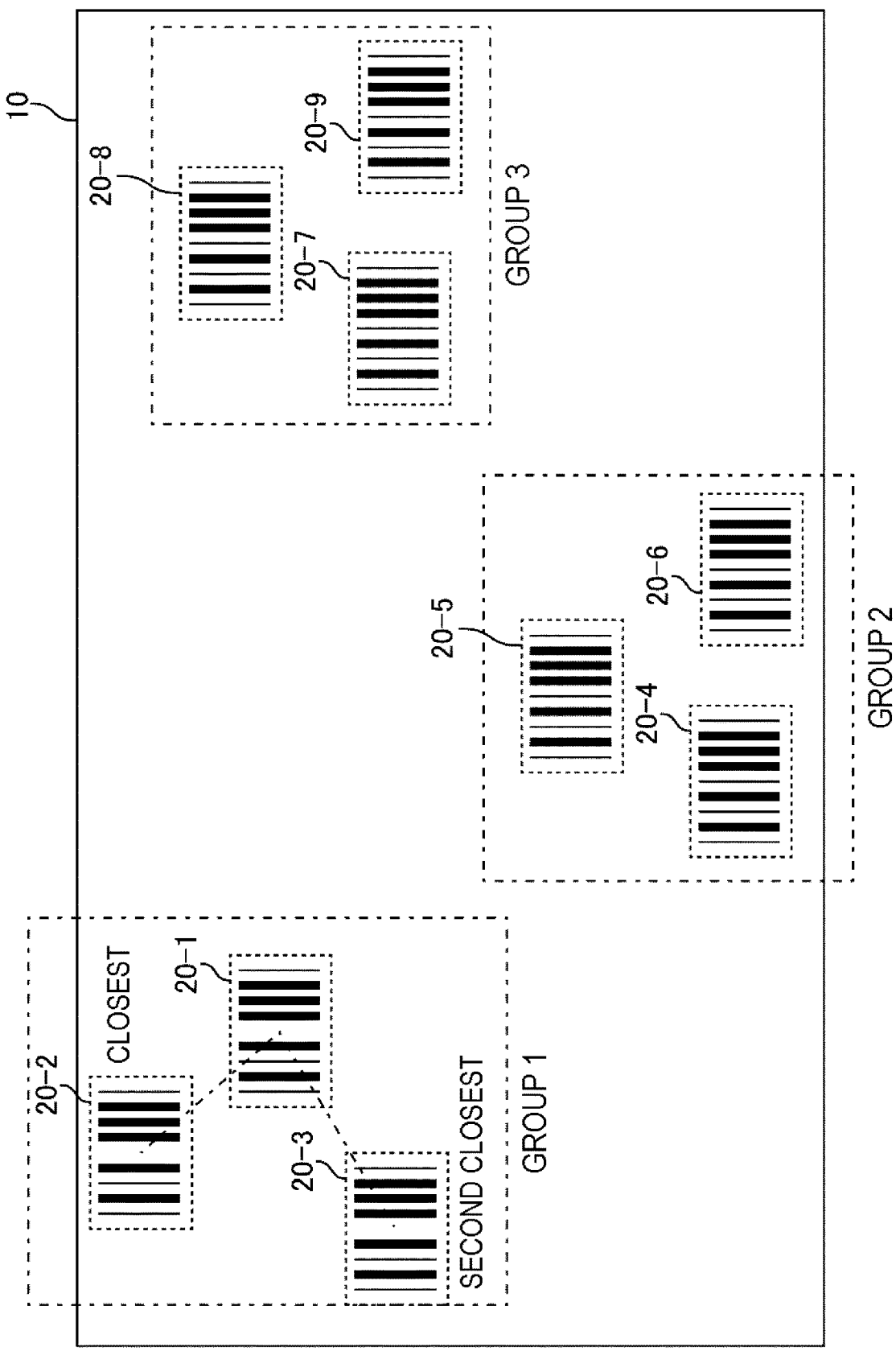
FIG. 14 is a first diagram illustrating a method of dividing markers into groups on the basis of distance.

FIG. 14 is a first diagram illustrating a method of dividing markers into groups on the basis of a distance. In this example, an identifier is computed by a combination of three sub-identifiers. First, the conversion unit 2020 detects bar codes 20-1 to 20-9 from the camera image 10. Next, the grouping unit 2060 computes a distance from the center of the bar code 20-1 to each of the bar codes 20. The grouping unit 2060 determines a bar code 20 having a shortest distance from the center of the bar code 20-1 and a bar code 20 having a second shortest distance therefrom. In FIG. 14, the former is the bar code 20-2, and the latter is the bar code 20-3. Consequently, the grouping unit 2060 assigns the bar codes 20-1 to 20-3 to the same group (group 1).

Next, the grouping unit 2060 computes distances from the center of the bar code 20-4 to other bar codes 20 (bar codes 20-5 to 20-9) in which belonging groups are not determined. The grouping unit 2060 then determines a bar code 20 having a shortest distance from the center of the bar code 20-4 and a bar code 20 having a second shortest distance therefrom. The former is the bar code 20-5, and the latter is the bar code 20-6. Consequently, the grouping unit 2060 assigns the bar codes 20-4 to 20-6 to the same group (group 2).

Finally, the grouping unit 2060 assigns three bar codes 20, the group to be assigned thereto has not been determined yet, to the same group (group 3).

Here, in the above-described example, the grouping unit 2060 initially processes the bar code 20-1, and next processes the bar code 20-4. However, the order of marker to be processed is arbitrary. For example, the grouping unit 2060 performs processing in order from a marker of an early point in time of detection by the conversion unit 2020. In addition, for example, the grouping unit 2060 processes markers in ascending order of the sub-identifier thereof.

In addition, for example, a marker which is representative (hereinafter, representative marker) of each group may be determined in advance, and the representative marker may be set to be processed by the grouping unit 2060. The grouping unit 2060 determines a group to which markers other than the representative marker belong, on the basis of a distance between each of the representative markers.

For example, in the example of FIG. 14, the bar code 20-1, the bar code 20-4, and the bar code 20-7 are set to representative markers. In this case, each of the bar codes 20 belongs to any of a group including the bar code 20-1, a group including the bar code 20-4, and a group including the bar code 20-7. The grouping unit 2060 assigns markers other than the representative markers to any one of groups, on the basis of a distance from the representative markers.

The representative marker is provided so that it can be distinguished from markers other than the representative marker. For example, a predetermined mark (such as a character string, a symbol, or a pattern) is provided in the vicinity of the representative marker or inside the representative marker. The definition of the representative marker may be set in the grouping unit 2060 in advance, or may be stored in a storage device accessible from the grouping unit 2060.

A method of determining the order of markers to be processed by the grouping unit 2060 or a method of determining a representative marker can similarly applied to other grouping methods described later.

In a case of dividing markers into groups with a focus on a distance between markers in this manner, it is not necessary to consider the direction of the marker or the like. Therefore, the load of a process of dividing markers into groups is reduced. In addition, in a case markers are manually disposed on a product or the like, only a distance between the markers may be considered, and the direction of the marker or the like may not be considered. Therefore, work for disposing the markers is facilitated.

Note that a method of assigning markers located close to each other to the same group is not limited to the above-described method. For example, the grouping unit 2060 may divide markers into groups using a method of "assigning markers, which are located at a location within a predetermined distance from a certain marker A, to the same group as the marker A".

Figure 15:
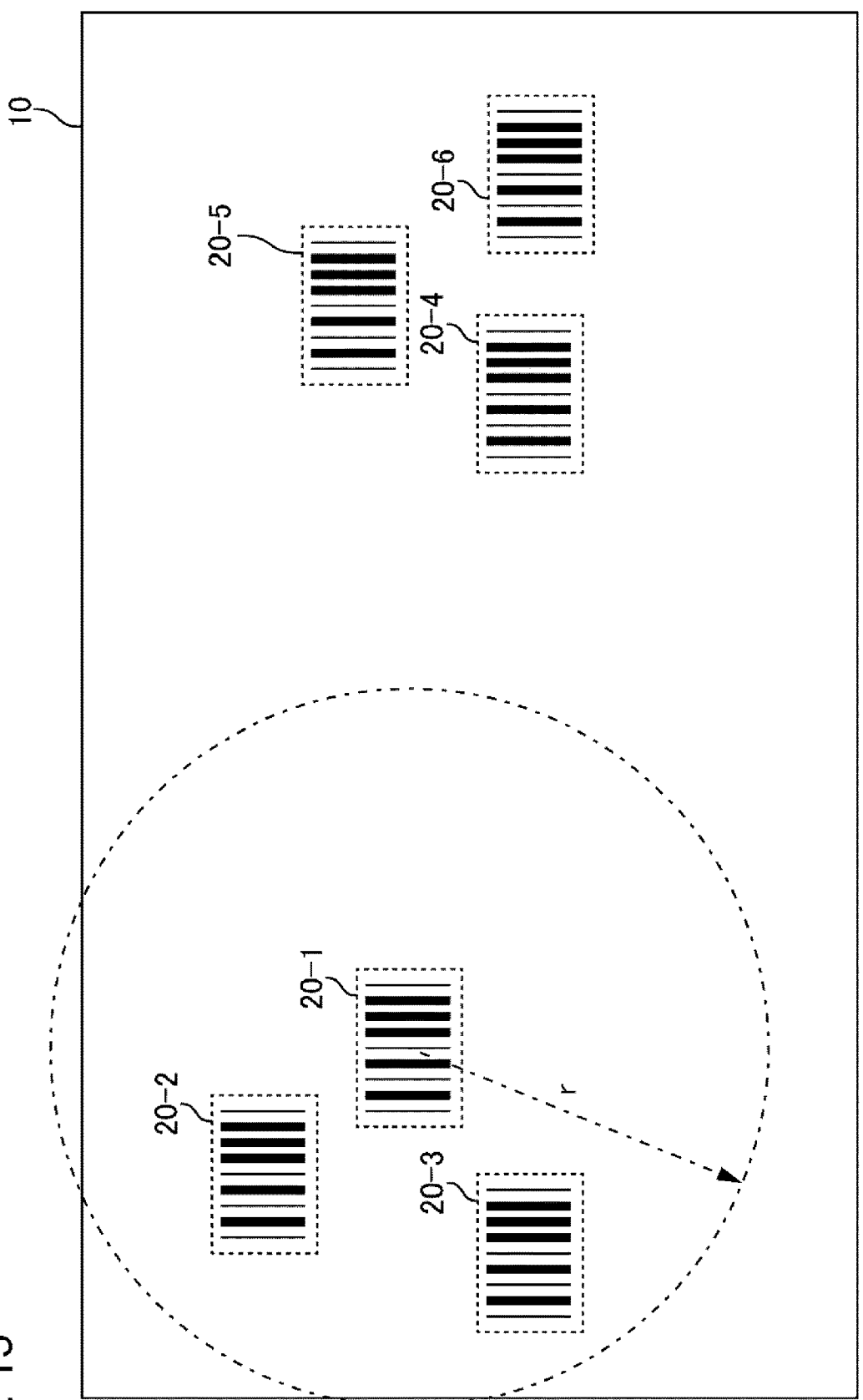
FIG. 15 is a second diagram illustrating a method of dividing markers into groups on the basis of distance.

FIG. 15 is a second diagram illustrating a method of dividing markers into groups on the basis of distance. In this example, a predetermined distance is set to r. In FIG. 15, bar codes 20 located at locations where a distance from the center of the bar code 20-1 is equal to or less than the predetermined distance r are the bar code 20-2 and the bar code 20-3. Consequently, the grouping unit 2060 assigns the bar codes 20-1 to 20-3 to the same group (group 1). The predetermined distance r is defined by, for example, a relative length with respect to the size (for example, lateral width) of the bar code 20.

Note that, in a case of this method, the number of markers included in a group may be fixed, or may not be fixed. In a case of the former, in a case where the number of markers included in the same group is larger than a predetermined number, for example, the grouping unit 2060 performs an error output. In this case, it is considered that an error was occurred when, for example, capturing a marker or disposing the marker.

<<Grouping Based on Distance Between Markers and Direction of Marker>>

The grouping unit 2060 divides marker into groups on the basis of a distance between the markers and the direction of the marker. Hereinafter, some of the methods are illustrated. Note that a method of determining the direction of a marker will be described later.

<<<Method 1>>>

For example, the grouping unit 2060 divides markers into groups using a method of "assigning, to the same group as a marker A, a predetermined number of markers among markers located in a predetermined direction when seen from the center of the marker A in ascending order of distance from the marker A".

Figure 16:
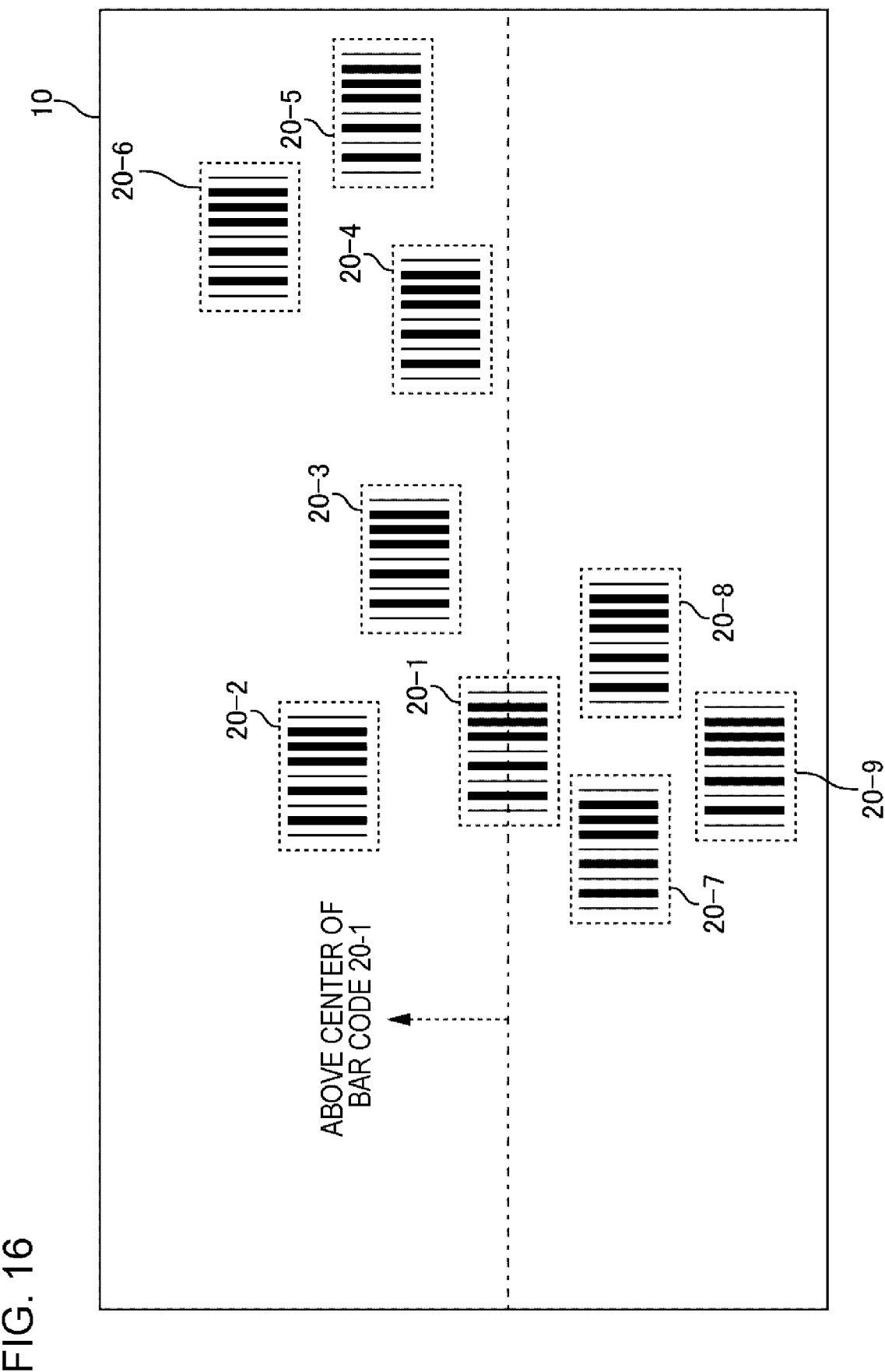
FIG. 16 is a first diagram illustrating grouping based on a distance between markers and the direction of a marker.

FIG. 16 is a first diagram illustrating grouping based on a distance between markers and the direction of the marker. In this example, an identifier is computed by a combination of three sub-identifiers. That is, the predetermined number is two. In addition, the predetermined direction is an upward direction.

First, the grouping unit 2060 determines bar codes 20 located further upward than the center of the bar code 20-1. Here, the bar codes 20-2 to 20-6 are determined. Next, the grouping unit 2060 computes distances from the center of the bar code 20-1 with respect to the bar codes 20-2 to 20-6. The grouping unit 2060 determines the bar code 20-3 as a bar code 20 having a shortest distance from the bar code 20-1. Further, the grouping unit 2060 determines the bar code 20-2 as a bar code 20 having a second shortest distance from the bar code 20-1. Consequently, the grouping unit 2060 includes the bar codes 20-1 to 20-3 in the same group. The bar codes 20-4 to 20-9 are also divided into groups using the same method.

<<<Method 2>>>

Figure 17:
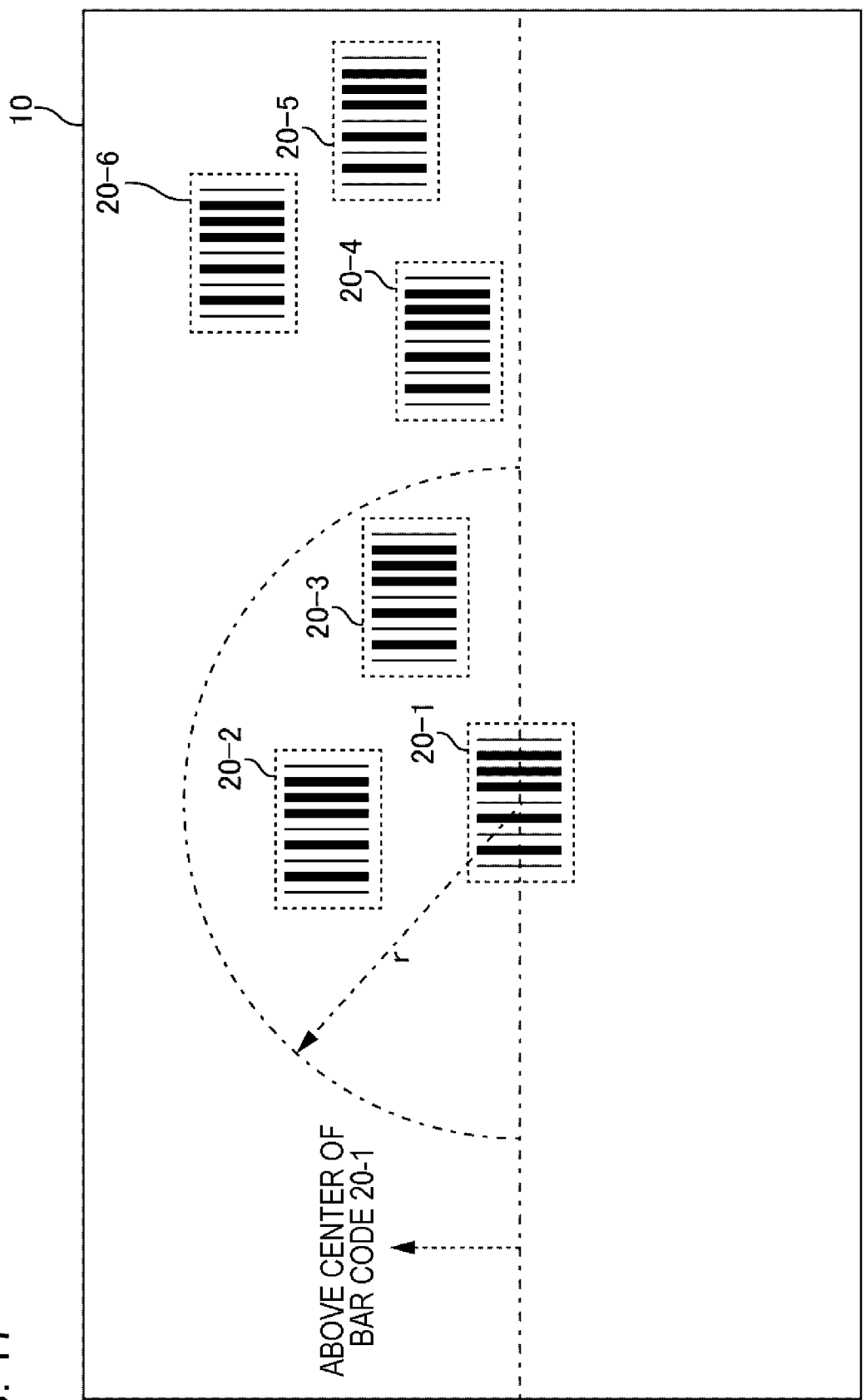
FIG. 17 is a second diagram illustrating grouping based on a distance between markers and the direction of a marker.

In addition, for example, the grouping unit 2060 may divide markers into groups using a method of "including markers, among markers located in a predetermined direction when seen from the center of a certain marker A, in which a distance from the marker A is equal to or less than a predetermined distance, in the same group as that to which the marker A belongs". FIG. 17 is a second diagram illustrating grouping based on a distance between markers and the direction of the marker. In this example, an identifier is also computed by a combination of three sub-identifiers. In addition, the predetermined direction is an upward direction, and the predetermined distance is r. The predetermined distance r is defined by, for example, a relative distance with respect to the size (for example, lateral width) of a bar code 20-A.

In the example of FIG. 17, bar codes 20 located further upward than the center of the bar code 20-1 are the bar codes 20-2 to 20-6. Further, bar codes 20, among the bar codes 20-2 to 20-6, in which a distance from the bar code 20-1 is equal to or less than the predetermined distance r are the bar code 20-2 and the bar code 20-3. Consequently, the grouping unit 2060 assigns the bar codes 20-1 to 20-3 to the same group.

<<<Method 3>>>

Figure 18:
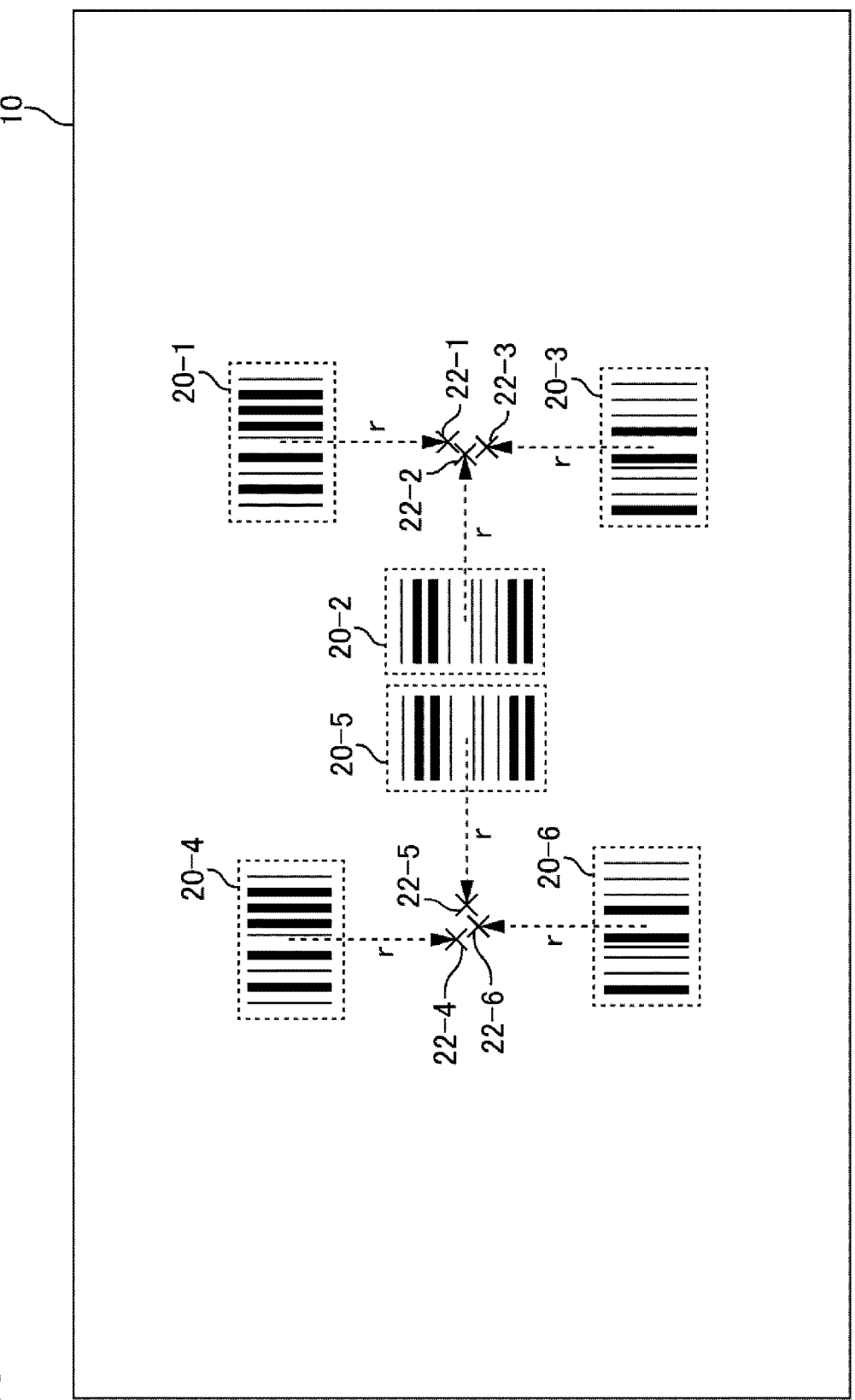
FIG. 18 is a third diagram illustrating grouping based on a distance between markers and the direction of a marker.

In addition, for example, the grouping unit 2060 may divide markers into groups using a method of "assigning markers to the same group so that positions (hereinafter, reference points) apart from the center of the marker are close to each other". FIG. 18 is a third diagram illustrating grouping based on a distance between markers and the direction of the marker. In this example, an identifier is also computed by a combination of three sub-identifiers. In addition, the predetermined direction is an upward direction, and the predetermined distance is r. The predetermined distance r is defined by, for example, a relative distance with respect to the size (for example, lateral width) of a bar code 20-A.

First, the grouping unit 2060 computes reference points 22 located at a position apart from the center of the bar code 20 by the distance r in an upward direction, for each bar code 20. The bar codes 20 are divided into groups on the basis of a distance between each of the reference points 22. For example, the grouping unit 2060 determines a reference point closest to a reference point 22-1 corresponding to the bar code 20-1 and a reference point 22 second closest thereto. Here, a reference point 22-2 corresponding to the bar code 20-2 is determined as the former, and a reference point 22-3 corresponding to the bar code 20-3 is determined as the latter. Consequently, the grouping unit 2060 assigns the bar codes 20-1 to 20-3 to the same group. Similarly, the grouping unit 2060 assigns the bar codes 20-4 to 20-6 to the same group.

Note that, in a case where a distance between the reference points 22 is equal to or less than a predetermined distance r2, the grouping unit 2060 may assign to the same group bar codes 20 corresponding to those reference point 22.

Here, in the examples of FIGS. 15, 16, and 18, attention is focused on a distance between markers. For example, in cases of FIGS. 15 and 16, the bar code 20-7 or the bar code 20-8 is located closer to the bar code 20-1 than the bar code 20-2 or the bar code 20-3. Therefore, in a case where a method of assigning to the same group bar codes 20 located at a close distance is adopted, bar codes included in the same group as that to which the bar code 20-1 belongs are the bar code 20-7 and the bar code 20-8. However, the direction of a marker is considered, and thus the bar code 20-7 and the bar code 20-8 are not included in the same group as that to which the bar code 20-1 belongs.

In a case of FIG. 18, the bar code 20-2 and the bar code 20-5 are disposed close to each other. However, these bar codes 20 are not included in the same group due to grouping considering the direction of a marker.

In a case where grouping considering the direction of a marker is performed in this manner, markers belonging to different groups can be disposed close to each other. That is, markers can be disposed closely. Thus, the space of a location at which markers are disposed can be effectively utilized.

<<<Method of Determining Direction of Marker>>>

There are various methods in which the grouping unit 2060 determines the direction of a marker. For example, it is assumed that information (direction information) capable of being used in the determination of the direction of a marker is provided in the vicinity of the marker. In this case, the grouping unit 2060 detects direction information provided in the vicinity of a marker, and uses this direction information to determine the direction of the marker.

The direction information is any mark such as a character string, a symbol, or a pattern. The definition of the direction information may be set in the grouping unit 2060 in advance, or may be stored in a storage device accessible from the grouping unit 2060.

Figure 19:
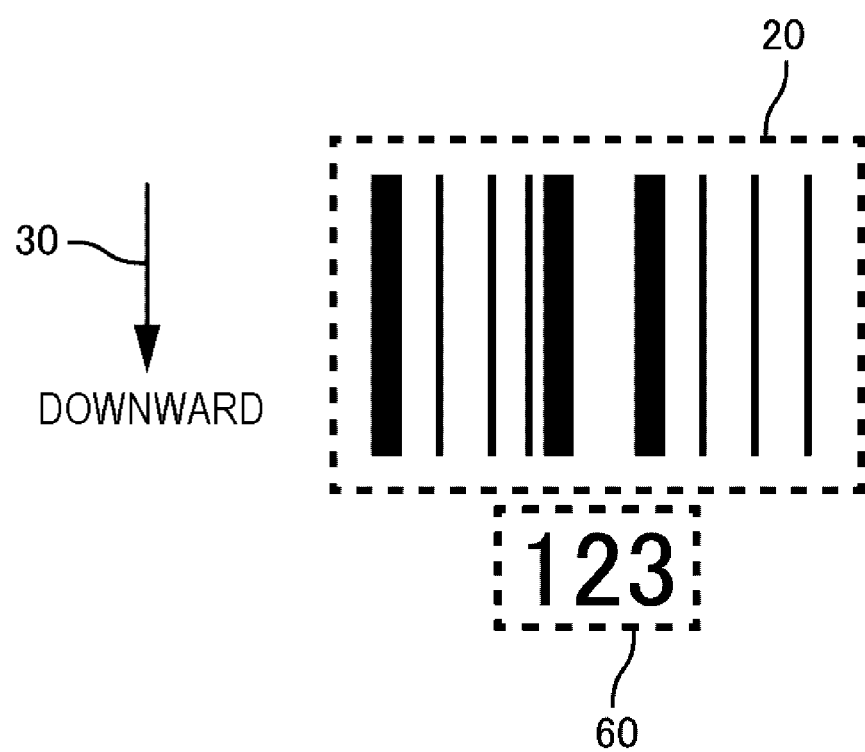
FIG. 19 is a diagram illustrating direction information which is provided in the vicinity of a marker.

FIG. 19 is a diagram illustrating direction information which is provided in the vicinity of a marker. In FIG. 19, a marker is a bar code 20. In addition, in FIG. 19, the direction information is a character string 60 which is attached below the bar code 20.

The grouping unit 2060 detects a bar code 20 from the camera image 10, and further detects the character string 60 from the vicinity of the detected bar code 20. The grouping unit 2060 determines the direction of the bar code 20 on the basis of a positional relationship between the bar code 20 and the character string 60. For example, in FIG. 19, the grouping unit 2060 determines "a direction with which a direction 30 becomes downward" as the direction of the bar code 20.

Note that, in a case where a plurality of markers are included in the camera image 10, a plurality of character strings 60 which are direction information are also included therein. Consequently, for example, the grouping unit 2060 associates a bar code 20 with the character string 60 disposed closest to the bar code 20. The grouping unit 2060 determines the direction of the bar code 20 on the basis of a positional relationship the bar code 20 and the character string 60 corresponding to the bar code 20.

Figure 20A:
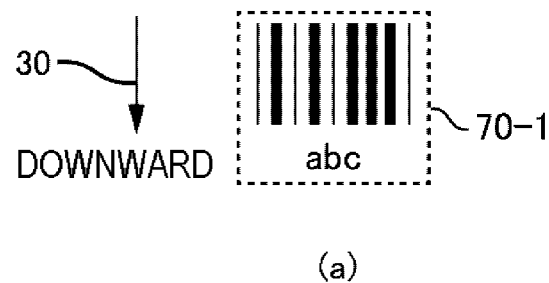
FIG. 20 are diagrams illustrating a marker capable of determining a direction.
Figure 20B:
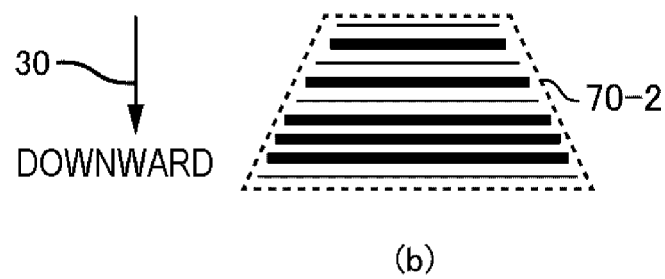
Figure 20C:
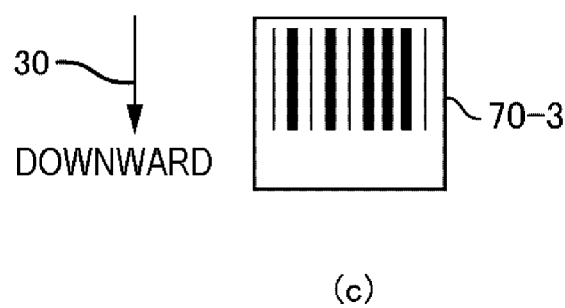

In addition, the direction of a marker may be able to be determined by the marker itself. This can be achieved by forming a marker to be an asymmetric mark. FIG. 20 are diagrams illustrating a marker capable of determining a direction. A marker 70-1 of FIG. 20A includes a character string only downward. A marker 70-2 of FIG. 20B is formed in the shape of a trapezoid the upper side of which is shorter than the lower side. A marker 70-3 of FIG. 20C is surrounded by a frame line, and is configured such that the upper space within the frame line is narrower than the lower space.

The markers of FIG. 20 are all vertically asymmetric figures. The grouping unit 2060 uses the asymmetry of such markers to determine the directions of the markers. For example, the directions of the respective markers 70 of FIG. 20 are all "directions with which the direction 30 becomes downward of the marker 70".

<<<Grouping Based on Shape Formed by Marker>>

Figure 21A:
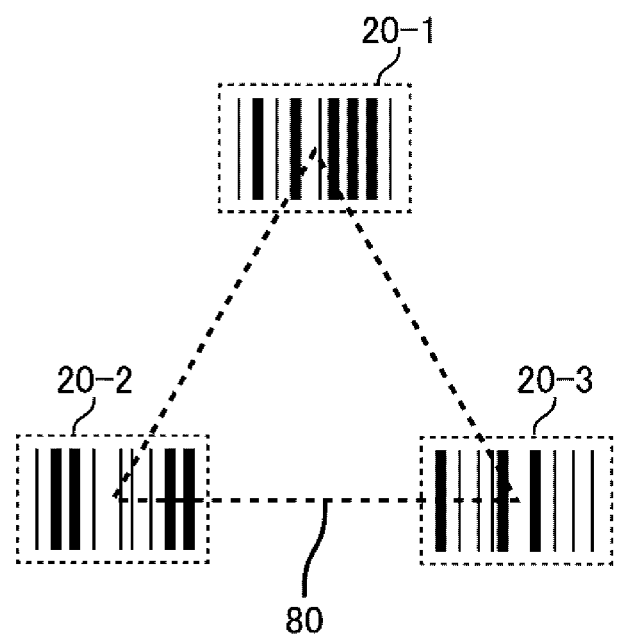
FIG. 21 are diagrams illustrating an example in which a predetermined shape is formed by handling the positions of markers as vertexes.

The grouping unit 2060 assigns to a group a plurality of markers constituting sides or vertexes of one predetermined shape. FIG. 21 are diagrams illustrating an example in which a predetermined shape is formed by handling the positions of markers as vertexes. In FIG. 21A, each center of bar codes 20-1 to 20-3 is located at the vertex of an equilateral triangle 80. In other words, the bar codes 20-1 to 20-3 constitute one equilateral triangle 80. Consequently, in a case of the example of FIG. 21, the grouping unit 2060 includes three bar codes 20 representing respective vertexes of one equilateral triangle 80 in one group.

Figure 21B:
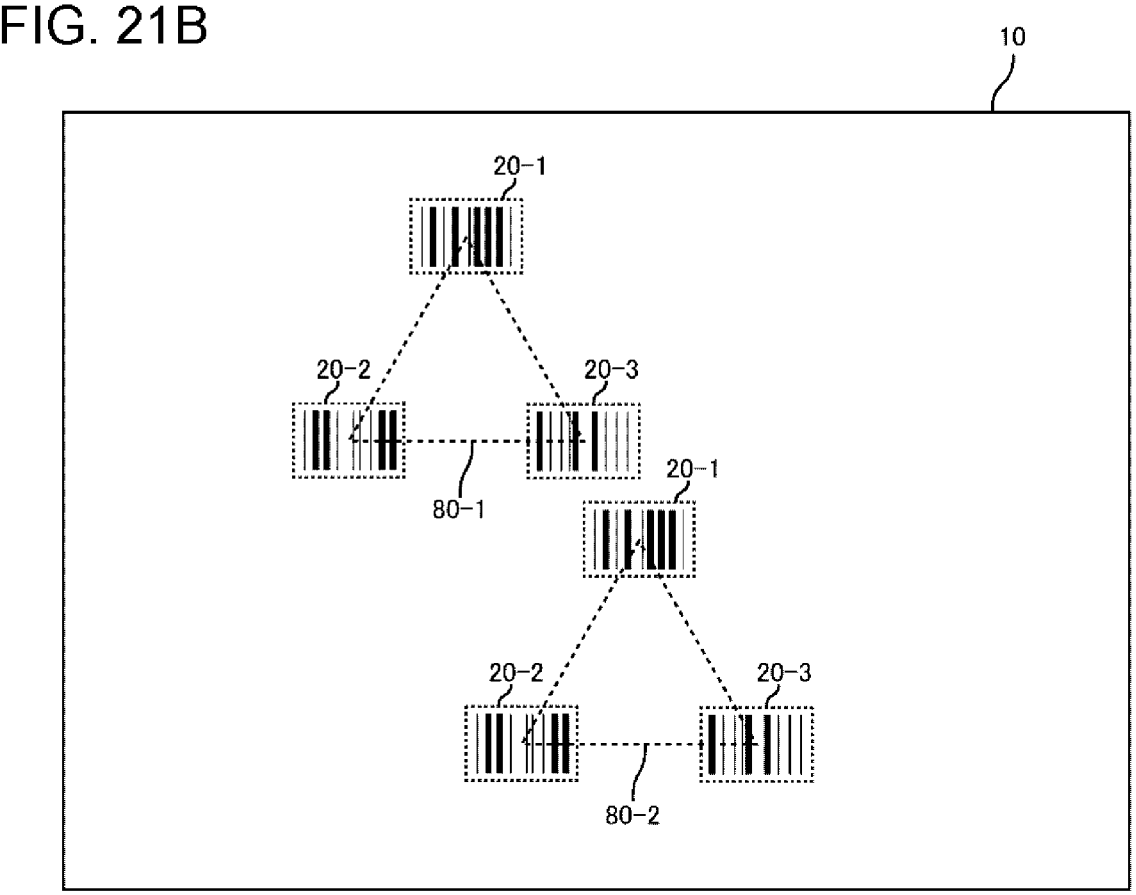

In FIG. 21B, six bar codes 20 are included in the camera image 10. First, the grouping unit 2060 detects the center of each of the bar codes 20. As to each of the detected centers, The grouping unit 2060 then make a group for each of three centers constituting the vertexes of the equilateral triangle 80. In this example, one equilateral triangle 80-1 is formed by each center of the bar codes 20-1 to 20-3. In addition, an equilateral triangle 80-2 is formed by each center of the bar codes 20-4 to 20-6. Consequently, the grouping unit 2060 assigns the bar codes 20-1 to 20-3 to a group. In addition, the grouping unit 2060 assign the bar codes 20-4 to 20-6 to the other group.

Figure 22A:
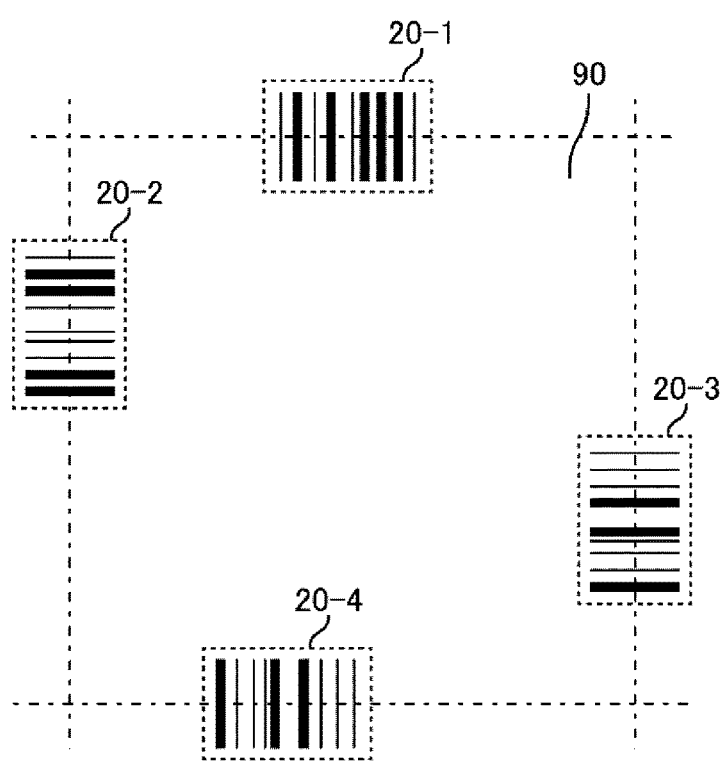
FIG. 22 are diagrams illustrating an example in which a predetermined shape is formed by sides which are determined by markers.

FIG. 22 are diagrams illustrating an example in which a predetermined shape is formed by sides which are determined by markers. In FIG. 22A, a straight line in a longitudinal direction which passes through the center of each bar code 20 constitutes each side of a square 90. In other words, the bar codes 20-1 to 20-4 constitute one square 90. Consequently, in a case of the example of FIG. 22A, the grouping unit 2060 assigns to one group four bar codes 20-1 to 20-9 representing the respective sides of one square 90.

Figure 22B:
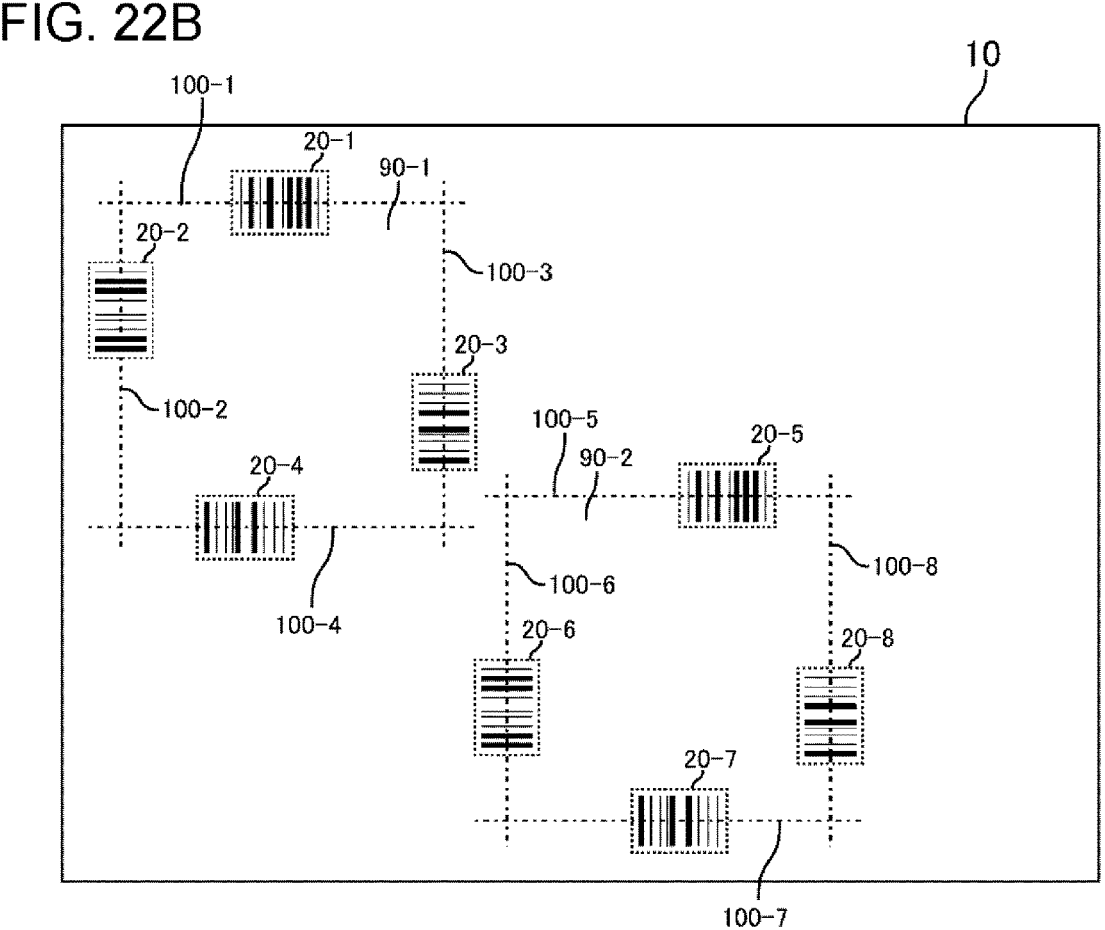

In FIG. 22B, eight bar codes 20 are included in the camera image 10. First, the grouping unit 2060 detects the center of each of the bar codes 20. Next, regarding each of the bar codes 20, the grouping unit 2060 computes a straight line 100 that passes through the center of the bar code 20 and extends in the longitudinal direction of the bar code 20. The grouping unit 2060 then determines four straight lines 100 constituting one square, and includes bar codes 20 corresponding to the four straight lines 100 in the same group.

In FIG. 22B, one square 90 is formed by straight lines 100-1 to 100-4. Consequently, the grouping unit 2060 includes the bar codes 20-1 to 20-4 corresponding to the straight lines 100-1 to 100-4 in one group. Similarly, one square 90 is formed by straight lines 100-5 to 100-8. Consequently, the grouping unit 2060 includes the bar codes 20-5 to 20-8 corresponding to the straight lines 100-5 to 100-8 in one group.

As described above, even in a case where a method of including markers constituting a predetermined shape in the same group is adopted, markers belonging to different groups can be disposed close to each other. For example, in FIG. 21B, the bar code 20-3 and the bar code 20-4 are shown so as to be disposed close to each other. In this manner, markers belonging to different groups can be disposed close to each other, and thus it is possible to effectively utilize a space in which markers are disposed.

<Grouping Based on Information Representing Grouping>

The grouping unit 2060 detects information (hereinafter, grouping information) representing grouping of markers from the camera image 10. The grouping unit 2060 then performs grouping of markers on the basis of the grouping information. Hereinafter, some of pieces of the grouping information will be illustrated.

<<<Example 1 of Grouping Information>>>

The grouping information is, for example, a frame that surrounds markers to be assigned to the same group. In this case, the grouping unit 2060 detects a frame that surrounds a plurality of markers from the camera image 10. The grouping unit 2060 assigns each marker surrounded by this frame line to the same group.

Figure 23:
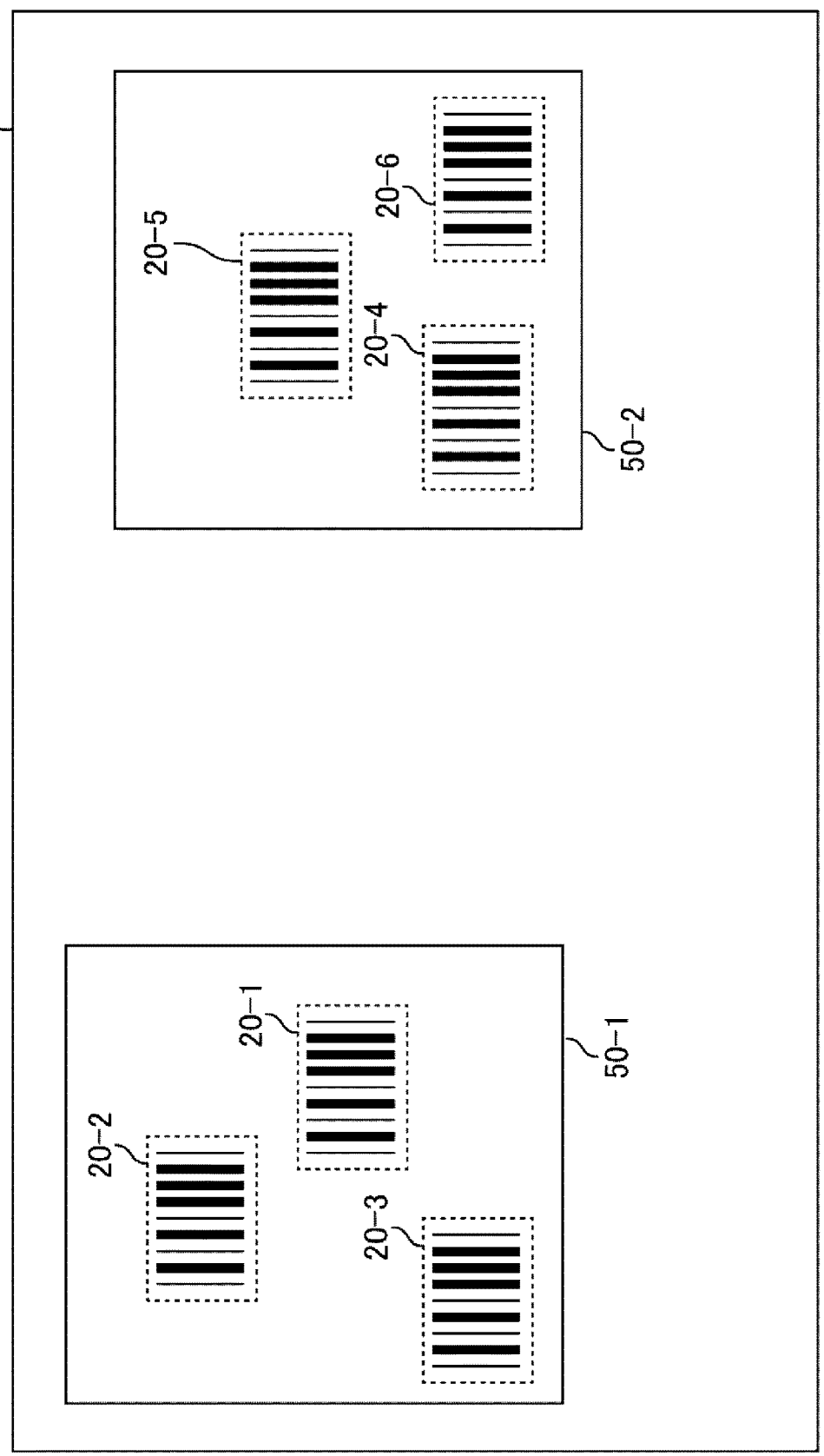
FIG. 23 is a diagram illustrating a method of performing grouping using grouping information representing a frame.

FIG. 23 is a diagram illustrating a method of performing grouping using grouping information representing a frame. In FIG. 23, bar codes 20-1 to 20-3 are surrounded by a frame line 50-1. In addition, bar codes 20-4 to 20-6 are surrounded by a frame line 50-2.

Consequently, the grouping unit 2060 assigns the bar codes 20-1 to 20-3 to one group. In addition, the grouping unit 2060 assigns the bar codes 20-4 to 20-6 to the other group.

Figure 24:
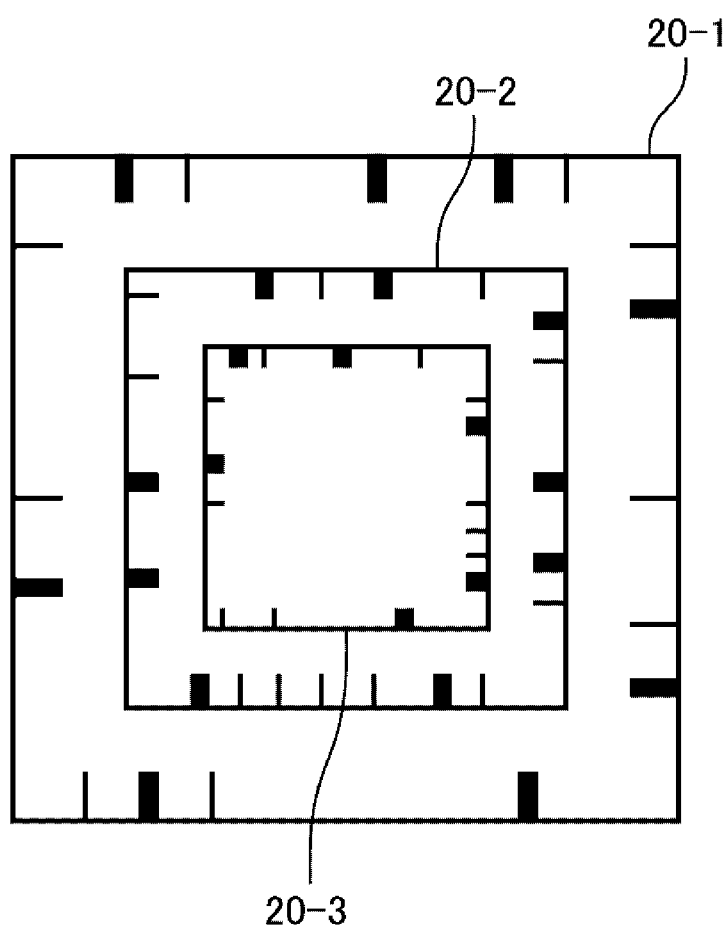
FIG. 24 is a diagram illustrating a case in which a component of a marker serves as a frame that surrounds another marker.

Here, the frame that surrounds markers to be assigned to the same group may be a component of the marker. FIG. 24 is a diagram illustrating a case in which a component of a marker serves as a frame that surrounds another marker. In FIG. 24, the inside of a marker 70-1 is hollow. A marker 70-2 and a marker 70-3 are included in the hollow portion. That is, the marker 70-2 and the marker 70-3 are surrounded by frames which are components of the marker 70-1. The grouping unit 2060 assigns the marker 70-2 and the marker 70-3, located at the hollow portion of the marker 70-1, to the same group as the marker 70-1.

In this manner, a frame that surrounds markers included in the same group is realized by a component of the marker, and thus it is possible to simultaneously perform a process of detecting a marker and a process of detecting a frame. Thus, the load of a process required for the detection of grouping information is reduced.

<<Example 2 of Grouping Information>>

Figure 25:
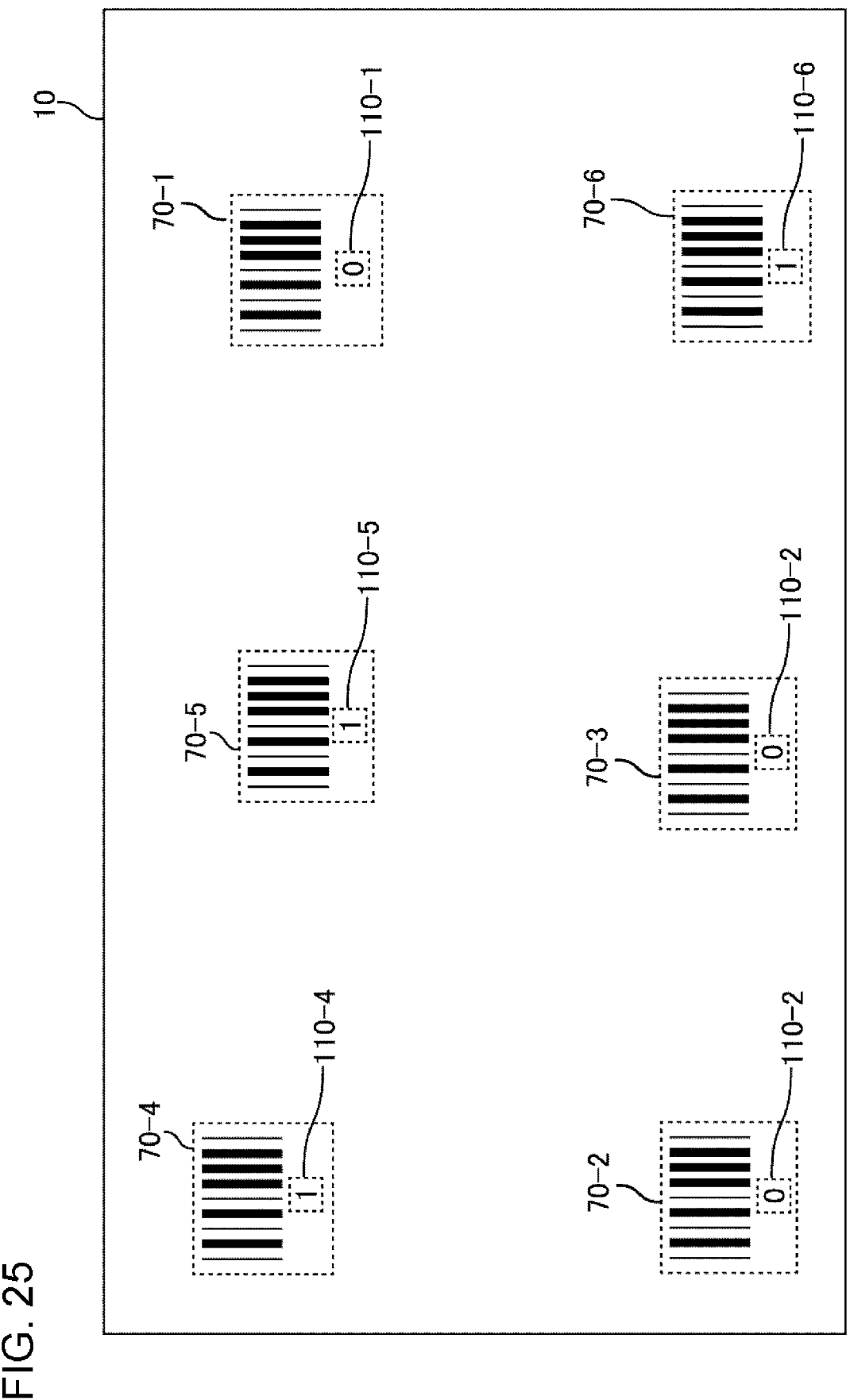
FIG. 25 is a diagram illustrating a method of performing grouping of markers using sub-markers provided inside the markers.

The grouping information is, for example, any mark (hereinafter, sub-marker) which is provided inside a marker or in the vicinity of the marker. The sub-marker is, for example, a character string, a symbol, a pattern, or the like. FIG. 25 is a diagram illustrating a method of performing grouping of markers using sub-markers provided inside the markers. In FIG. 25, markers 70 to be assigned to the same group are provided with sub-markers 110 representing a common numerical value.

A sub-marker 110 of "0" is included within both markers 70-1 to 70-3. On the other hand, a sub-marker 110 of "1" is included within both markers 70-4 to 70-6.

Consequently, the grouping unit 2060 assigns the markers 70-1 to 70-3 having the sub-marker 110 of "0" to one group. In addition, the grouping unit 2060 assigns the bar codes 20-4 to 20-6 having the sub-marker 110 of "1" to the other group.

According to a method of representing grouping of the markers 70 using the sub-markers 110, each of a plurality of markers 70 to be assigned the same group can be disposed at any location falling within the angle of view of a camera. Thus, the degree of freedom of the installation location of a marker 70 becomes higher.

Note that, in a case where the sub-marker 110 is caused to be included within the marker 70, it is possible to simultaneously perform the detection of the marker 70 and the detection of the sub-marker 110. Thus, the load of a process required for the detection of the grouping information is reduced.

In a case where a method of performing grouping using the grouping information is adopted, the group of a marker can be easily determined with human eyes. Thus, when a marker is manually installed, the work is facilitated. In addition, it is possible to easily determine whether an error is not present at the installation location of a marker.

The definition of the grouping information may be set in the grouping unit 2060 in advance, and may be stored in a storage device accessible from the grouping unit 2060.

<Flow of Processes>

Figure 26:
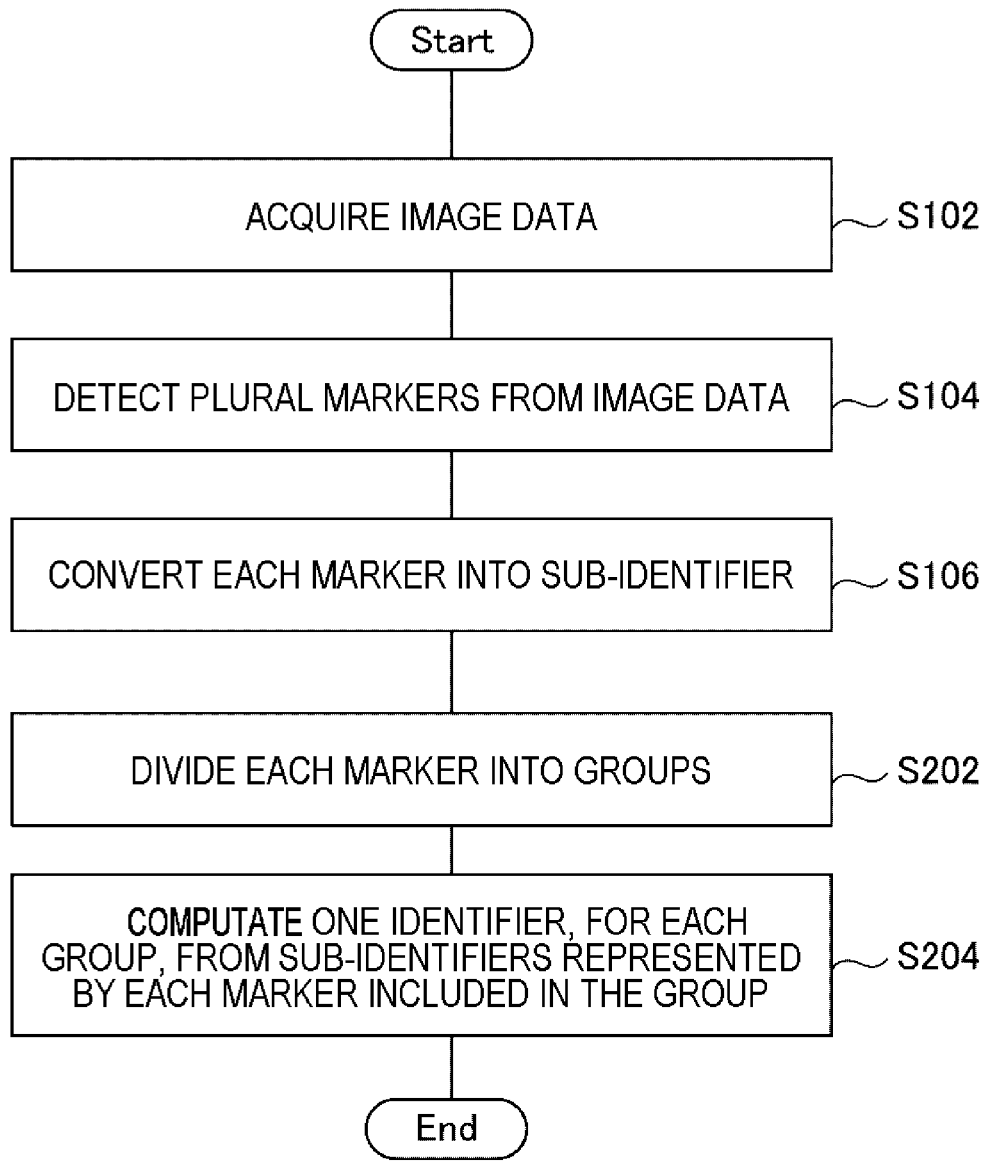
FIG. 26 is a flow diagram illustrating a flow of processes which are executed by the information processing apparatus of Example Embodiment 2.

FIG. 26 is a flow diagram illustrating a flow of processes which are executed by the information processing apparatus 2000 of Example Embodiment 2. Processes which are executed in S102 to S106 of FIG. 22 are the same as the processes which are executed in S102 to S106 of FIG. 4.

In S202, the grouping unit 2060 divides markers into groups. In S204, the computation unit 2040 computes one identifier, for each group, from sub-identifiers represented by each marker included in the group.

<Example of Hardware Configuration>

The hardware configuration of the information processing apparatus 2000 of Example Embodiment 2 is represented by FIG. 3, for example, similarly to the information processing apparatus 2000 of Example Embodiment 1. A program module for realizing each function of the information processing apparatus 2000 of Example Embodiment 2 is further included in the storage device 1080 of Example Embodiment 2.

<Advantageous Effect>

According to the information processing apparatus 2000 of the present example embodiment, markers (markers belonging to different groups) used for the computation of identifiers different from each other may be included in the camera image 10. Therefore, as compared with a case in which markers used for the computation of identifiers different from each other must not be included in the camera image 10, a lot of markers can be disposed in a narrower range. As a result, objects to be identified can be disposed more closely.

Example Embodiment 3

An information processing apparatus 2000 of Example Embodiment 3 is represented by FIG. 1 similarly to the information processing apparatus 2000 of Example Embodiment 1, or is represented by FIG. 12 similarly to the information processing apparatus 2000 of Example Embodiment 2. Except for points described below, the apparatus of the present example embodiment has the same function as that of the information processing apparatus 2000 of Example Embodiment 1 or the information processing apparatus 2000 of Example Embodiment 2.

The computation unit 2040 of Example Embodiment 3 performs error detection of a sub-identifier. Specifically, information (hereinafter, error detection information) used in error detection of a sub-identifier obtained from a certain marker is to be included in information obtained from another marker. The error detection information is, for example, a parity bit.

For example, it is assumed that the information processing apparatus 2000 obtains sub-identifiers X, Y, and Z from three markers A, B, and C, respectively, to compute one identifier. In this case, for example, error detection information of the sub-identifier X obtained from the marker A is associated with the marker B. Specifically, in the sub-identifier information, the error detection information of the sub-identifier X is associated with the marker B. The computation unit 2040 performs error detection on the sub-identifier X obtained from the marker A by using this error detection information.

In this example, the error detection information of the sub-identifier X may be a portion of the sub-identifier Y associated with the marker B. For example, 1 bit at the end of the sub-identifier Y is set to the parity bit of the sub-identifier X.

The error detection information of a certain sub-identifier may be associated with not only another one marker, but also other plurality of markers. For example, in the above-described example, the error detection information of the sub-identifier X obtained from the marker A is associated with both the marker B and the marker C.

Figure 27:
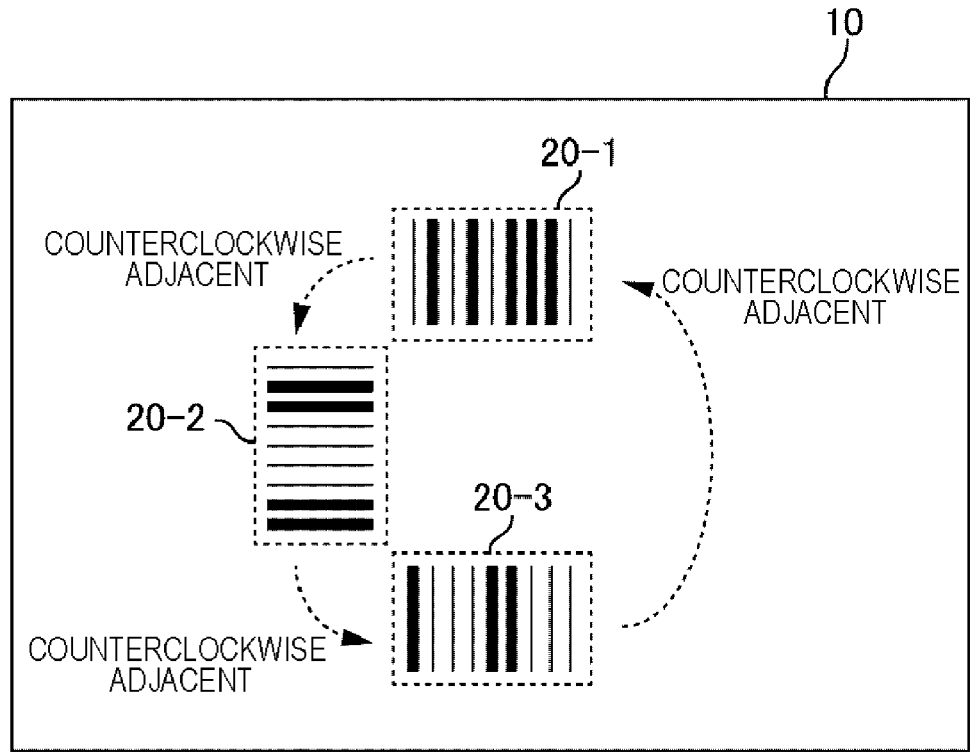
FIG. 27 is a diagram illustrating the association of markers with error detection information.

It is arbitrary which marker is associated with error information of which sub-identifier. FIG. 27 is a diagram illustrating the association of markers with error detection information. In FIG. 27, error detection information for detecting an error of a sub-identifier obtained from a bar code 20 is associated with a bar code 20 which is counter-clockwise adjacent when seen from the bar code 20. For example, error detection information for detecting an error of a sub-identifier obtained from a bar code 20-1 is associated with a bar code 20-2.

Note that the error detection information is not limited to the aforementioned parity bit. Various existing techniques can be used in a technique itself for detecting an error of data.

A process in a case where an error is detected in a sub-identifier is arbitrary. For example, the information processing apparatus 2000 outputs error information, and terminates a process of computing an identifier. For example, the error information is a text message which is displayed on a display device connected to the information processing apparatus 2000, a voice message which is output from a speaker connected to the information processing apparatus 2000, or the like.

The computation unit 2040 may further have a function of performing error correction on a sub-identifier in which an error is detected. In this case, not only the error detection information but also information (error correction information) used in error correction are to be further included in information obtained from a marker.

For example, in the above-described example, the sub-identifier X obtained from the marker A is divided into two, and thus two pieces of data of x1 and x2 are obtained. In this case, for example, these x1 and x2 are used as the error correction information. For example, in the sub-identifier information, x1 is associated with the marker B, and x2 is associated with the marker C. In a case where an error is detected in the sub-identifier X, the computation unit 2040 restores the sub-identifier X using x1 associated with the marker B and x2 associated with the marker C.

Note that a method of error correction is not limited to the above-described example. Various existing techniques can be used in a technique itself for correcting an error of data.

<Example of Hardware Configuration>

The hardware configuration of an information processing apparatus 2000 of Example Embodiment 3 is represented by FIG. 3, for example, similarly to the information processing apparatus 2000 of Example Embodiment 1. A program module for realizing each function of the information processing apparatus 2000 of Example Embodiment 2 is further included in the storage device 1080 of Example Embodiment 3.

<Advantageous Effect>

A sub-identifier obtained from a marker included in the camera image 10 may be different from an identifier (sub-identifier associated with the marker in the sub-identifier information) to be originally obtained from the marker. For example, this may occur in such a case that a marker is contaminated, or a portion of the camera image 10 is overexposed due to the influence of ambient light or the like.

According to the present example embodiment, information used in error detection of a sub-identifier obtained from a certain marker is included in information obtained from another marker. In this manner, the information processing apparatus 2000 can determine whether a sub-identifier obtained from a certain marker is correct. Thus, it is possible to prevent an erroneous sub-identifier from being obtained from the camera image 10, and to prevent an erroneous identifier from being obtained from the camera image 10.

Further, error correction may be performed in addition to the error detection of a sub-identifier. The error correction is performed. Thereby, even in a case where an error is present in a sub-identifier obtained from a certain marker, it is possible to obtain a correct sub-identifier by correcting the error.

Hereinbefore, although the example embodiments of the present invention have been set forth with reference to the accompanying drawings, the example embodiments are merely illustrative of the present invention, and a combination of the respective example embodiments or various configurations other than those stated above can be adopted.

This application claims priority from Japanese Patent Application No. 2016-163578 filed on Aug. 24, 2016, the content of which is incorporated herein by reference in its entirety.

What is claimed is:

1. An information processing apparatus comprising:
   at least one processor;
   a memory storing instructions; and
   a camera configured to capture an image including a plurality of markers,
   wherein the at least one processor executes the instructions to:
   detect the plurality of markers from the image by matching an image region in the image with a digital representation of the plurality of markers, the plurality of markers being a code representing a first identifier;
   decode each of the plurality of markers into the first identifier;
   divide the plurality of markers included in the image into groups by performing:
      (a1) detecting a center of each of the plurality of markers, and
      (a2) making the groups, each including the centers of the plurality of markers constituting vertices of an equilateral polygon, and in each of the groups, a number of the centers of the plurality of markers corresponds to a number of the vertices of the equilateral polygon; and
   compute, for each group, a second identifier based on a plurality of the first identifiers included in the group.

2. The information processing apparatus according to claim 1,
   wherein error detection information for detecting whether an error is present in the first identifier converted from a second marker detected from the image is associated with a first marker detected from the image, and
   the at least one processor is further configured to detect an error of the first identifier converted from the second marker, using the error detection information associated with the first marker.

3. The information processing apparatus according to claim 2, wherein error correction information for correcting an error of the first identifier detected from the second marker is associated with the first marker, and the at least one processor is further configured to correct an error of the first identifier converted from the second marker, using the error correction information associated with the first marker.

4. A control method which is executed by a computer, the method comprising:

capturing an image including a plurality of markers by a camera;

detecting the plurality of markers from the image by matching an image region in the image with a digital representation of the plurality of markers, the plurality of markers being a code representing a first identifier;

decoding each of the plurality of markers into the first identifier;

dividing the plurality of markers included in the image into groups by performing:
(a1) detecting a center of each of the plurality of markers, and
(a2) making the groups, each including the centers of the plurality of markers constituting vertices of an equilateral polygon, and in each of the groups, a number of the centers of the plurality of markers corresponds to a number of the vertices of the equilateral polygon; and computing, for each group, a second identifier based on a plurality of the first identifiers included in the group.

5. A non-transitory computer-readable medium storing a program causing a computer to execute:

capture an image including a plurality of markers by a camera;

detecting the plurality of markers from the image by matching an image region in the image with a digital representation of the plurality of markers, the plurality of markers being a code representing a first identifier;

decoding each of the plurality of markers into the first identifier;

dividing the plurality of markers included in the image into groups by performing:
(a1) detecting a center of each of the plurality of markers, and
(a2) making the groups, each including the centers of the plurality of markers constituting vertices of an equilateral polygon, and in each of the groups, a number of the centers of the plurality of markers corresponds to a number of the vertices of the equilateral polygon; and computing, for each group, a second identifier based on a plurality of the first identifiers included in the group.

6. An information processing apparatus comprising:

at least one processor;

a memory storing instructions; and a camera configured to capture an image including a plurality of markers, wherein the at least one processor executes the instructions to:

detect the plurality of markers from the image by matching an image region in the image with a digital representation of the plurality of markers, the plurality of markers being a code representing a first identifier;

decode each of the plurality of markers into the first identifier;

divide the plurality of markers included in the image into groups by performing:
(b1) detecting a center of each of the plurality of markers,
(b2) computing, for each of the plurality of markers, a straight line that passes through the centers of the plurality of markers and extends in the longitudinal direction, and
(b3) making each group including the straight lines constituting sides of an equilateral polygon, and in each of the groups, a number of the straight lines corresponds to a number of sides of the equilateral polygon; and computing, for each group, a second identifier based on a plurality of the first identifiers included in the group.

* * * * *